United States Patent
Hayball et al.

(10) Patent No.: US 6,600,749 B1
(45) Date of Patent: Jul. 29, 2003

(54) PLANNING SYSTEM FOR BROADBAND MULTI-SERVICE CONNECTIONS

(75) Inventors: Clive Colin Hayball, Sawbridgeworth (GB); Nigel Lawrence Bragg, Weston Colville (GB); Niall Forbes Ross, Nr Great Dunmow (GB); Andrew J Tunnicliffe, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/380,347

(22) PCT Filed: Mar. 26, 1998

(86) PCT No.: PCT/GB98/00923
§ 371 (c)(1),
(2), (4) Date: Nov. 18, 1999

(87) PCT Pub. No.: WO98/47307
PCT Pub. Date: Oct. 22, 1998

(30) Foreign Application Priority Data

Apr. 11, 1997 (GB) .............................................. 9707398

(51) Int. Cl.⁷ .............................................. H04L 12/28
(52) U.S. Cl. ........................ 370/400; 370/351; 706/46
(58) Field of Search ................................ 370/351–352, 370/395, 60.1, 400, 401, 254, 255; 379/202; 395/51–52; 909/903; 709/223

(56) References Cited

U.S. PATENT DOCUMENTS

| | | | | |
|---|---|---|---|---|
| 4,999,833 A | * | 3/1991 | Lee | 370/94.1 |
| 5,175,800 A | * | 12/1992 | Galis | 395/51 |
| 5,179,632 A | * | 1/1993 | Masui | 395/52 |
| 5,408,526 A | * | 4/1995 | McFarland | 379/202 |
| 5,541,917 A | * | 7/1996 | Farris | 370/60.1 |
| 5,630,025 A | * | 5/1997 | Dolby | 395/51 |
| 5,953,338 A | * | 9/1999 | Ma | 370/395 |

FOREIGN PATENT DOCUMENTS

| | | | |
|---|---|---|---|
| EP | 0 733 967 | 9/1996 | 706/45 |
| EP | 0 748 142 | 12/1996 | 370/395 |
| WO | WO 95/35611 | 12/1995 | 700/28 |

OTHER PUBLICATIONS

Loh, Artificial intelligence search techniques as fault-tolerant routing strategies, Parallel Computing, vol. 22, No. 8, Oct. 30, 1996, pp. 1127–1147.

* cited by examiner

Primary Examiner—Dang Ton
Assistant Examiner—Robert W. Wilson
(74) Attorney, Agent, or Firm—Barnes & Thornburg

(57) ABSTRACT

A syntactical representation is used to generate data describing a hierarchical broadband network and relationships between it elements. The format of the syntactical representation resembles logic programming language clauses. The syntactical representation is used to specify a broadband connection problem to be solved. Data describing physical resources and functionality of a set of network elements is entered into an inference engine which applies an algorithm to its input in order to find a solution to a specified connections planning problem. The algorithm is recursive and uses artificial intelligence techniques; such as, first fail hierarchical planning and hill-climbing to guide the inference engine's search for a solution.

49 Claims, 10 Drawing Sheets

| Priority | Subgoal and mode |
|---|---|
| 4 | provision_instance(T1, T2, B, IM) |
| 4 | behavior_rule(B, Bs) |
| 4 | behavior_rule_generator(B, L) |
| 3 | link(T1, T2, Link) |
| 3 | link(T1, T2, Link) |
| 3 | link(T1, T2, Link) |
| 2 | class_info(class, Type, Level) |
| 2 | logical_link(T1, T2, Link, IM) |
| 2 | provision_endpoints(L, IM) |
| 2 | provision_endpoint(T, IM) |
| 2 | realise_endpoint(Type, T, IM) |
| 2 | provision_behaviour(Type, Bs, T1, T2, IM) |
| 2 | construct_sequence(Bs, T1, T2, IM) |
| 2 | add_logical_link(T1, T2, Relation, IM) |
| 2 | X=Y |
| 2 | X=Y |
| 1 | integer(Id) |

Fig. 8

PLANNING SYSTEM FOR BROADBAND MULTI-SERVICE CONNECTIONS

FIELD OF THE INVENTION

The present invention relates to communications networks, in particular, though not exclusively to planning of multi-service connections in a hierarchical broadband network.

BACKGROUND TO THE INVENTION

Broadband communications networks must deliver a variety of services, often in combination, over transport and access networks which differ geographically in their capabilities and quality of service parameters. Also, communications data is often subject to various forms of transformation, such as compression and translation, as part of its carriage between parties involved.

Broadband networks are likely to be heterogeneous for quite some time in the future, in terms of the connectivity types winch they offer and the available service gateways. There is therefore a problem when provisioning a service in matching the needs of an end user to the facilities which are available within a service provider.

Planning connections in hierarchical broadband communications networks involves similar planning a route of links and/or nodes in a simple network. However, due to the existence of the hierarchy in the broadband communications network, the routing problem can give rise to a hierarchy of routing sub-problems. A classical routing algorithm (eg Dijkstra's) could be applied to find a route between two nodes. However, the same routing problem could be applied recursively to sub-problems arising in the hierarchical network, but if a sub-problem has no solution then a higher level route must be modified.

Another complication in a heterogenous broadband network is the differing natures of links between nodes, for example a link between two nodes may only be capable of transferring a certain type of data between the two nodes. Traffic carrying and/or transport characteristics of such nodes constitute "behaviors" of the nodes. Therefore, a corresponding hierarchy of behavior rules need to be found to describe the traffic carrying transport characteristics of individual links and/or nodes in addition to the route of links and/or nodes itself in order to fully plan a connection which provisions a service to the end user.

In U.S. Pat No. 4,999,833 (Lee), there is described a system which applies a set of heuristic rules to a knowledge base to select connectivity paths through a network. However, the connectivity paths are selected from a routing sequence based upon a simple list of communications links and so is not capable of dealing with transformation of communications data as part of its carriage over the network. Furthermore, the system relates to radio networks only rather than heterogeneous networks and so does not overcome the problems associated with planning multi-service connections over transport and access networks which differ geographically in their capabilities and quality of service parameters.

SUMMARY OF THE INVENTION

A novel approach outlined herein supports the creation and management of broadband service connections in an integrated manner, using a combination of structured modeling and goal-based route finding.

According to a first aspect of the present invention, there is provided in a network comprising a plurality of nodes and links, each said node having at least one end point connecting it to a said link element, each said link between said end points having a type, a method of producing a connection plan representing at least one connection between said end points in said network, said connection plan comprising data describing a set of said end points and said types of said links between the end points said method comprising the steps of:

creating a data representation of at least part of said network;

creating a data representation of end points of said connection; and applying an algorithm to said data representations to generate said connection plan.

Preferably, a said representation comprises a list of at least one clause, each said clause comprising at least one term.

Said clauses may comprise assertions and implications.

Preferably, said algorithm operates to select a said term of a said clause representing said connection as a sub-goal and recursively attempts to solve said sub-goal.

A said sub-goal may be assigned a priority, and said algorithm selects a said sub-goal with a highest said priority.

A said algorithm may select a said sub-goal which is a clause with fewest said terms.

Said algorithm may select a said sub-goal according to order of its said terms.

Said algorithm may select a sub-goal with a lowest position in said network hierarchy.

Said algorithm may select said sub-goal randomly.

Said algorithm may select a said clause with which to solve said sub-goal according to position of said clause in said list of clauses.

Said algorithm may select a said clause with which to solve said sub-goal by selecting a said clause having a term included in said connection plan.

Said algorithm may select a said clause with which to solve said sub-goal by selecting a clause which is lowest in said network hierarchy.

Said algorithm may select a said clause with which to solve said sub-goal by selecting a clause with a term having smallest capacity.

Said algorithm may randomly select a clause with which to solve said sub-goal.

Preferably, said clauses represent data describing features of said network, said features selected from the set:

classes of said network nodes;

end points of said network nodes;

links of said network;

schematic representations of said link types.

A said link typemay be selected from the set:

binding;

realization;

behavior;

containment.

A graphical representation of said connection plan may be described.

Said connection plan is preferably implemented as a set of connections in said network.

Said representation may comprise a substantially Prolog-like syntax.

According to a second aspect of the present invention there is provided in a network comprising a plurality of nodes and links, each said node having at least one end point connecting it to a said link element, each said link between said end points having a type, connection planning apparatus for planning at least one connection between said end points in said network by creating a connection plan comprising a set of said end points and said type of said link between the end point said connection planning apparatus comprising:

means of creating a representation of at least part of said network;

means of creating a representation of end points of said connection; and an inference engine which uses said representation to generate said connection plan.

Said representation may comprise a list of at least one clause, each said use comprising at least one term.

Said clauses may comprise horn clauses.

Said inference engine may select a said term of a said clause representing said connection as a sub-goal and recursively attempts to solve said sub-goal.

A said sub-goal may be assigned a priority, and said inference engine elects a said sub-goal with a highest said priority.

Said inference engine may select a said sub-goal which is a clause with aid fewest said terms.

Said inference engine may select a sub-goal according to order of its said terms.

Said inference engine selects said sub-goal with a lowest position in said network hierarchy.

Said inference engine may select said sub-goal randomly.

Said inference engine may select a said clause with which to solve said sub-goal according to position of said clause in said list of clauses.

Said inference engine may select a said clause with which to solve said sub-goal by selecting said clause having a term included in said connection plan.

Said inference engine may select a said clause with which to solve said sub-goal by selecting a clause which is lowest in said network hierarchy.

Said inference engine may select a said clause with which to solve sub-goal by selecting a clause with a term having smallest capacity.

Said inference engine may randomly select a clause with which to solve said sub-goal.

Said clauses may represent data describing features of said network, said features selected from the set:

classes of said network nodes; end points of said network nodes;

links of said network;

schematic representation of link types.

A said link type suitably selected from the set:

binding;

realization;

behavior;

containment.

Preferably, the connection planning apparatus further comprising means for displaying a graphical representation of said connection plan.

Said connection planning apparatus means may comprise means for implementing said connection plan as a set of connections in said network.

According to a third aspect of the present invention, there is provided a syntactical representation for describing capabilities and links in a hierarchical network, said syntactical representation comprising a list of at least one clause.

Said capability representation preferably comprises:

a node identifier;

an input data type;

an output data type; and a hierarchical network layer upon which said node appears.

Said link representation preferably comprises:

at least two nodes representing end points of said links; and a hierarchical network layer upon which said link appears.

Said representation may comprise a substantially Prolog-like syntax.

According to a fourth aspect of the present invention there is provides an inference engine for solving connection problems in a hierarchical network comprising:

a logic component comprising a specification of what it means to solve said problem; and a control component comprising a description of how said logic component is to be executed.

Said control component preferably comprises:

a computation rule for selecting sub-goals with which to solve said problems; and a selection rule for selecting clauses with which to solve aid selected sub-goals.

An inference engine may execute said logic component by applying techniques selected from the set:

hierarchical planning;

hill-climbing;

first fail.

According to a further aspect of the present invention there is provided a network management apparatus for a communications network comprising a plurality of interconnected network element devices, said network management apparatus comprising:

a plurality of device controllers each controlling at least one corresponding network element device, said plurality of device controllers comprising a plurality of device sub-controllers, wherein a plurality of functions performed by a network element device are each represented by a corresponding respective said device sub-controller; and said plurality of device controllers may be arranged in a manner which represents an arrangement of a service provided by said network element devices.

Preferably each said device sub-controller comprises: a data storage means storing data describing a function of a network element device; and a means for generating management control signals for controlling a said network element device. The device sub-controller preferably comprises an object data representation.

Preferably a set of connections between said device controllers are provided, said connections arranged in a manner which represents service connections between said network element devices.

This invention includes in a network management apparatus, a method of controlling a network comprising a plurality of network element devices each supporting a plurality of services implemented by functions of the network element devices, said method comprising the steps of:

representing each said function supported by a network element device by a corresponding respective device sub-controller by;

at each said sub-controller storing data signals representing a said function capability of said network element device; and operating said sub-controllers to generate a plurality of management control signals for controlling said network element device to provide said functionality in supporting said services.

The invention includes in a network management apparatus, a method of controlling a network comprising a plurality of network element devices each supporting a plurality of service functions, said method comprising the steps of:

representing each network element device by a corresponding device controller;

for each device controller, representing each function capability provided by a said corresponding network element device by a corresponding device sub-controller; and linking a plurality of said sub-controllers of different device controllers in a manner which represents a service connection supported by said network element devices.

The invention includes a method of constructing a management apparatus for a communications network comprising a plurality of node element devices, said method comprising the steps of:

representing a plurality of network element devices of the network by a corresponding plurality of function models, wherein each function model comprises a plurality of specifications of functionality of a said corresponding network element device; and implementing said function models as a plurality of device controllers each controlling a corresponding respective said network element device, wherein each said device controller comprises a plurality of device sub-controllers each device sub-controller corresponding to a service function provided by a network element device controlled by said device controller.

Preferably each said device sub-controller comprises: a data storage medium for storing a set of data signals describing a functionality of a network element device; and a control signal generating means for generating control signals for controlling a function of said network element device.

The invention includes in a communications network comprising a plurality of inter-connected nodes, each node providing a plurality of services, a method of planning a service between a source node and at least one destination node comprising the steps of:

storing data representing connections between said nodes;

storing data representing services provided by said nodes;

finding data representing a set of connections and services between said source and destination nodes which implement said service; and transforming said data representing a set of connections and services for application within a network controller.

A said service provided by a node may comprise transforming a first service type to a second service type.

Said data representing connections may comprise a name of a first node, a name of a second node and a name of a layer within which said nodes are contained.

Said data representing services may comprise a name of a node, a name of a first service type provided by said node and a name of a second service type provided by said node.

Said data transformed for application within a network controller may comprise an aggregated connection between said network nodes for implementing a said service.

The invention includes in a communications network comprising a plurality of inter-connected nodes, said nodes supporting at least one service function, a method of planning a connection supporting said service, said method comprising the steps of:

translating function capabilities of said nodes and connections between said nodes into a plurality of syntax constructs;

taking each said syntax construct as an operator in a planning system to obtain a connection plan solution; and transforming said connection plan solution into a connection model suitable for application within a network manager apparatus.

A said syntactical operator may comprise connection operator.

A said syntactical operator may comprise a transform operator representing a said function capability of a said node.

A said service may be represented in terms of a layered structure.

Said connection plan solution is preferably obtained using an artificial intelligence technique.

A said connection may comprise a multi-media service connection.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 8 illustrates priorities and modes associated with sub-goals used by the steps identified in FIG. 7;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
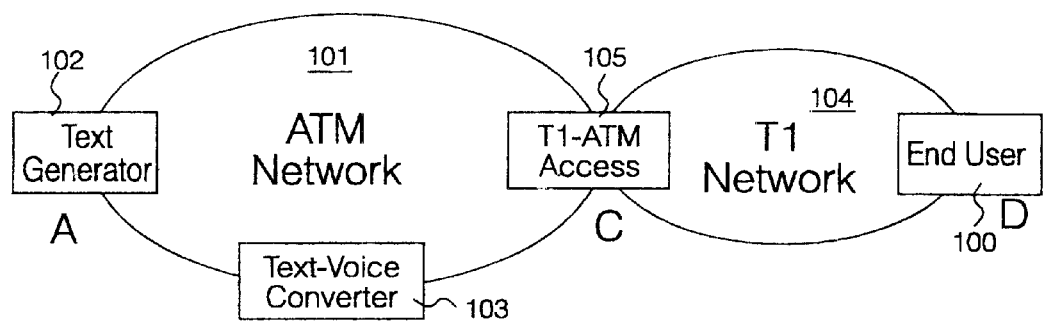
FIG. 1 herein illustrates schematically a portion of a broadband network (in practice, a broadband network would mainly have sub-layers, nodes and connections)

Referring to FIG. 1 herein, there is illustrated schematically a portion of broadband communications network comprising a plurality of nodes and links in which there exists a connection planning problem described with reference to a hybrid network including asynchronous transfer mode (ATM) and T1 transmission modes. An end user apparatus 100 eg a telephone can only communicate by voice signal, being connected into a public switched telephone network (PSTN) at a local exchange. Across on another side of ATM network 101 is a text generator system 102. Somewhere within the scope of the ATM network 101 is a text to voice converter 103 for converting text generated by the text generator to voice signals. Access between T1 network 104 and ATM network 101 is made via a T1-ATM access apparatus 105.

The problem in this example is that a user of the end user apparatus 100 wishes to receive a voice message from text generated by the text generator 102. The text generator 102 generates text data signals which are converted to voice signals by the text to voice converter 103, which are then relayed across the ATM network and T1 network via T1-ATM access node 105 to the end user. An operator at the text generator 102 enters text which is received as a voice signal by the end user 100 over their telephone apparatus.

This is one example of a multimedia service connection problem. In the context of general hybridized multimedia service supporting networks, there may be a large number of problems of this type, eg text to voice conversion, voice to text conversion, data conversion etc. These problems are potentially highly complex to solve, and complex to manage using a network manager system.

A problem is that not only must one be able to work out how to establish the necessary connectivity, to achieve an end-to-end service, but one must be able to map that connectivity onto the network management means to manage the physical resource hardware providing that service.

In the proposed approach herein, the connectivity and interworking capabilities offered by a broadband communications network are modeled in terms of:

(i) various transport and service sub-layers, nodes and connections between nodes;

(ii) cross-connect and interworking functions supported within nodes.

The capabilities illustrated in this example might be used to support a variety of different user services, including the insertion of automatically generated voice fragments from a library of text strings.

Figure 2:
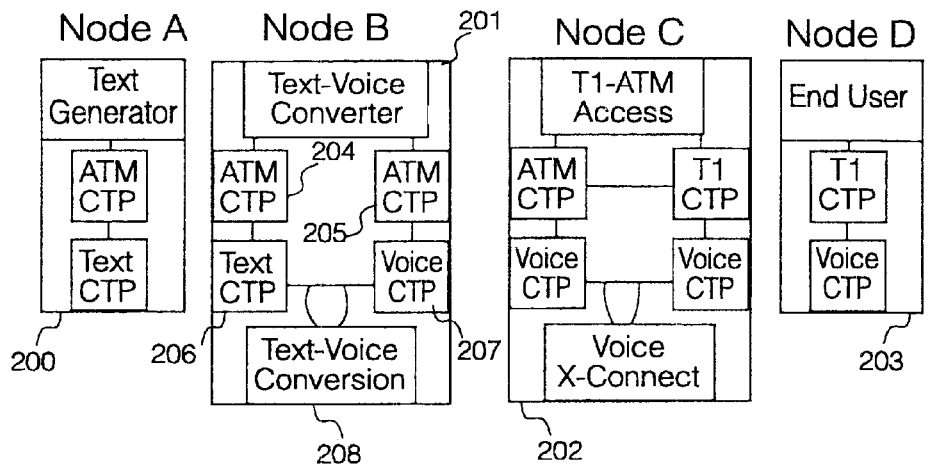
FIG. 2 herein illustrates a model for an architecture of a network management system for managing network elements of the network of FIG. 1 herein.
Figure 3:
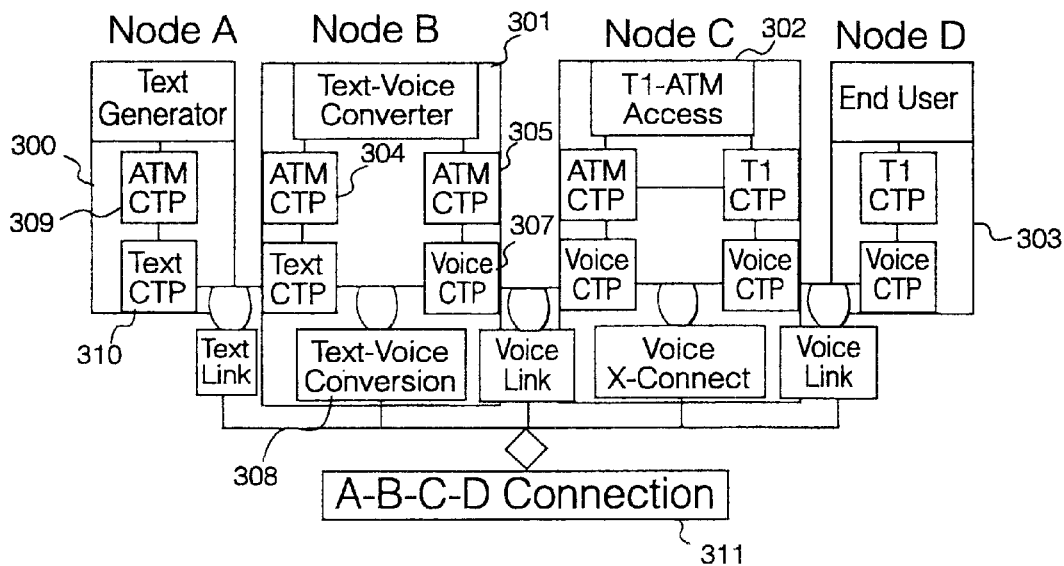
FIG. 3 herein illustrates an arrangement of a network controller apparatus for controlling individual network elements across the network of FIG. 1 herein.

FIGS. 2 and 3 herein illustrate one specific example of how the network element devices shown in FIG. 1 may be modeled, based on notations used within the synchronous digital hierarchy (SDH) and ATM management domains.

The notation of the model shown in FIG. 2 herein is based upon an application model concept as disclosed in the applicant's previous disclosure U.S. Ser. No. 08/921,649 filed Aug. 27, 1997, a copy of which is filed herewith, and the contents of which are incorporated herein by reference.

An application model comprises a representation of a plurality of application level elements, being elements of a management system relating to a physical resource such as a component, composite or system in which a functionality of said component, composite or system is represented independently of an internal structure of said component, composite or system.

An application level element may be capable of providing management signals relating to all aspects of managing a functionality of a component, composite or system independently of internal structure, for example providing signals describing a status or performance of a component, composite or system in terms of functionality independently of its internal structure or providing control of a component, composite or system independently of its internal structure. Suitably, application level elements are constructed from a set of managed objects, for example in accordance with the ITU-T TMN architecture standard.

An application model comprises a model for an external interface, ie a "black box" view of modeled physical resources, which can be used by a human operator or an application program.

An implementation model comprises representation of a collection of implementation level elements, which represent and interface with physical resources, and in which the specific internal layout of those resources, ie the physical and logical implementation details of physical resources are represented.

Each node of the network, comprising a physical network element device such as the text generator 102, text to voice converter 103, T1-ATM access node 105 and end user apparatus 100, is represented by a respective device controller 300, 301, 302, 303 in a network controller apparatus, operating to control node element devices of the network via operation, administration and maintenance (OAM) control signals transmitted across the network. Tie device controllers may comprise managed object as described in the ITU-T TMN architecture specifications. The device controllers 300–303 are structured and interconnected so as to represent the service functionality provided by their corresponding respective network element devices 102, 103, 105, 106. For example a text generator device controller 200 supports an ATM connection termination point function and a text connection termination point function. Similarly, a text to voice converter device controller 301 supports a pair of ATM connection termination point functions 204, 205, a text connection termination point function 206 and a voice connection termination point function 202, and text to voice conversion function 208.

Each device controller 300–303 comprises a plurality of sub-controllers, each of which controls a function provided by the corresponding network element device. The sub-controller may comprise managed objects as described in the ITU-T architecture specifications. For example the text generator 102 provides an ATM connection termination point facility which is controlled by ATM connection termination point sub-controller 309, and text generator 102 provides a text connection termination point which is supported by text connection termination point function sub-controller 310. Each sub-controller is implemented as a data storage device containing data signals describing functionality, eg functions provided by a device, and a means for generating function control signals for controlling that functionality. The sub-controllers of different device controllers in the network manager apparatus are interconnected through signal channels, representing service connection, links, paths and service functions.

In order to construct the network controller comprising the plurality of device controllers and constituent sub-controllers as shown in FIG. 3, firstly the network is modeled, resulting in a function model data which specifies functionality and connectivity, as shown schematically in FIG. 2 herein.

In FIG. 2 herein, each network element device is modeled in terms of the functions which it provides, and in FIG. 3 herein the network controller is constructed as a set of device controllers and sub-controllers which mirrors the functional structure of the network element devices themselves. For example a functional model 200 is prepared describing the text generator device 102. The functional model comprises a model 210 for an ATM connection termination point and a model 211 for a text connection termination point. The functional models are implemented in device controller 300 comprising part of a network controller apparatus, as an ATM connection termination point sub-controller 309 and a text connection termination point sub-controller 310.

Connections between the sub-controllers, embedded as part of the control signals sent to other sub-controllers are used to operate the corresponding network elements to provide connections, links, virtual paths and other services across the network. By reconfiguring the connections between sub-controllers, in the device controllers, the network can be managed as this interconnectivity is reflected in the actual network element devices which receive the OAM control signals from the network controller to implement these reconfigurations to the functionality of the corresponding network element devices.

The model may be formalized by translating the capabilities of each node and the connections between nodes into a syntax suitable for route finding.

The basic elements of the syntax are:
connection (S, X, Y)
  (meaning a layer S connection between locations X and Y) and:
  transform (S, T, X)
    (meaning an interworking function between service types S and T at node X-reduced to a cross-connect function when S=T)

In each of the above cases, the service type may itself be expressed in terms of layered structure, eg S=Voice/ATM (meaning the service is a voice over ATM service).

The connection problem is now solved in terms of a planning task which takes one end of the desired service connection as its start state, the other end as its goal state, and each connection and/or transform construct as an operator. Further constraints may be added to represent the quality of service parameters or other characteristics on network components. A known artificial intelligence technique may thus be applied to solving a multimedia service connection problem by finding an optimized, or at least a workable, solution of connections and transforms using the links and nodes as components of the solution.

Once a viable solution has been found, the resultant plan may be transformed back into a layered connection model suitable for application within a network management environment based on a network controller apparatus.

There now follows an application example for modeling the capabilities of the network example of FIG. 1. The capabilities represented in FIG. 1 may be represented syntactically as follows:

connection (text/ATM, A, B).
  (meaning ATM text connection between nodes A and B, ie text data may be transferred between locations A and B)
transform (text/ATM, voice/ATM, B).
  (meaning node B is capable of converting ATM text data to ATM voice data)
connection (voice/ATM, B, C).
  (meaning an ATM voice connection between nodes B and C, ie voice data may be transferred between locations B and C)
transform (voice/ATM, voice/ T1, C).
  (meaning node C is capable of converting ATM voice data to T1 voice data)
connection (voice/T1, C, D).
  (meaning T1 voice connection between nodes C and D, ie voice data may be transferred between locations C and D)

The planning goal is to connect text at node A to voice at node D. The solution (unique in this example) is a connection A-B-C-D with the text-voice conversion being carried out at node at B and voice cross-connection carried out at node C. The solution can be superimposed back onto the network model in the form of an aggregated connection 311 as shown in FIG. 3 herein, the aggregated connection 311 may be represented syntactically as follows:

connection (text/A TM, A, B), transform (text/ATM, voice/A TM, B), connection (voice/ATM, B, C), transform (voice/ATM, voice/T1, C), connection (voice/T1, C, D)

There will now be described possible extensions and other applications of the methods disclosed herein. The connection planning technique described above could be greatly facilitated by the pre-discovery of the "physical" connection topology of each connectivity service layer. For example, ATM networks will deploy PNNI (Private Network Node Interface) technology to allow ATM switching and end-user nodes to discover an abstract view of the ATM network topology (via peer-to-peer interaction) and to route connections across the discovered topology via selected routing algorithms. This concept could be applied to higher level connectivity services, starting perhaps with ATM adaptation layers, especially AAL2. The connections available at each connectivity service layer can be viewed in terms of Virtual Private Networks (VPNs) constructed across the next lower connection layer.

Another example of configuring a network manager using the connection planning method is the provisioning and configuration of distributed network elements. Configuration and provisioning of distributed network elements, utilizes the same technique as described hereinabove, but applied at "microcosmic" level of connections within nodes. An example would be the configuration of a signaling link between an access port and an internal frame processing device. This technique, coupled with a design tool to support the constructions system management models from component fragments, may make a major impact upon the time and effort involved in management system development.

A further formalization of the syntactical representation according to the preferred method will now be described, as well as algorithms including AI algorithms preferably executing on a network controller workstation which may be applied to data created according to the syntactical representation in order to implement it in solving problems such as broadband connections planning.

Figure 4:
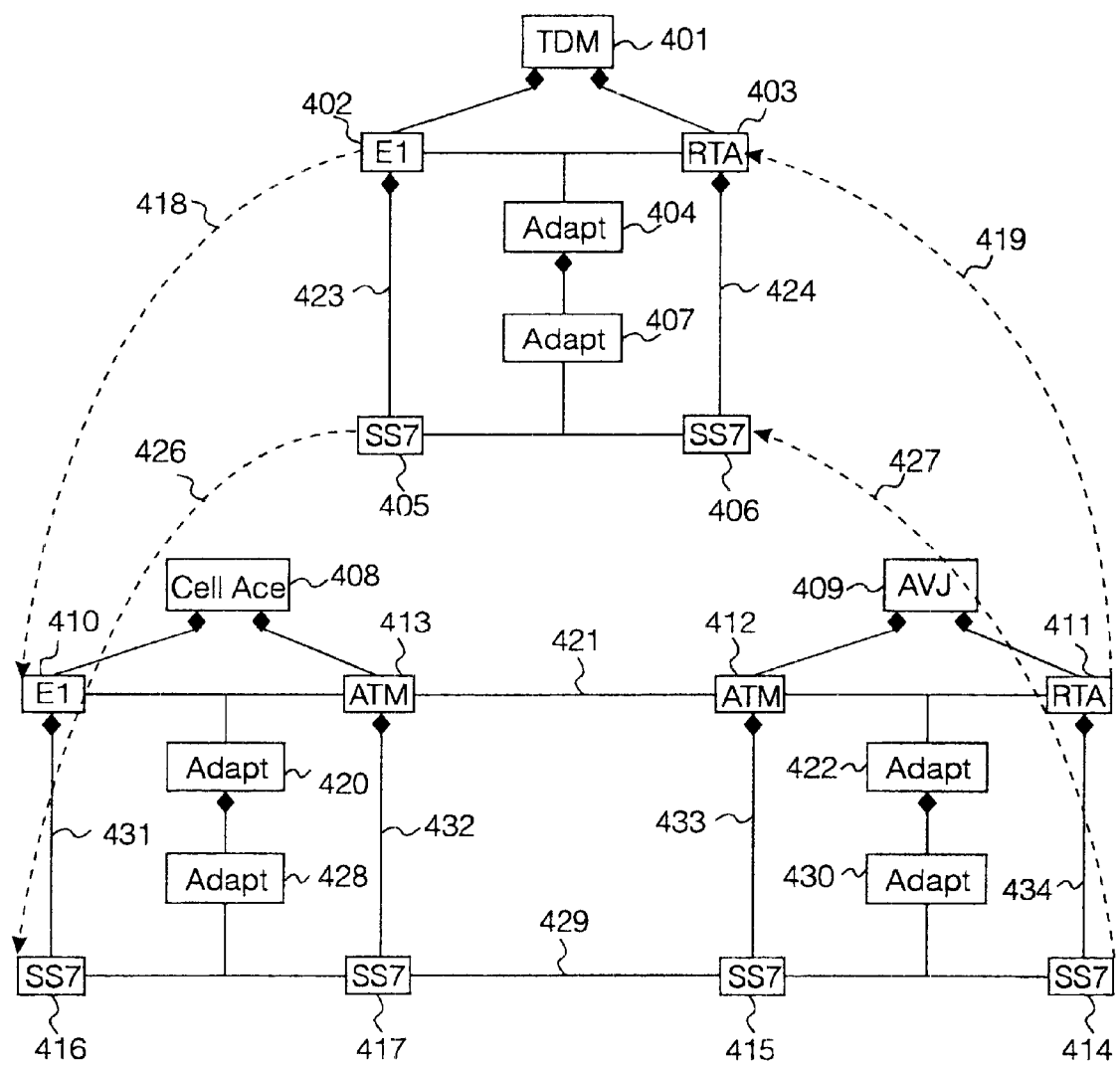
FIG. 4 illustrates schematically an Application Model representing a hierarchical network comprising instances and links between said instances.

A preferred embodiment and method according to the present invention will be illustrated with examples, the first of which is shown in FIG. 4 of the accompanying drawings.

In the preferred embodiment and method, data describing at least part of the hierarchical broadband network and a connection problem to be solved is described using a syntactical representation as disclosed herein above. An algorithm is applied to the network and problem data which attempts to solve the problem by generating a connection plan comprising a set of network nodes and/or links or other data describing network resources/elements which may be allocated to a connection in order to implement it in the network. The inventors envisage that running the algorithm to generate such a connection plan may be used to select a set of network connections to be implemented which can best satisfy certain criteria, eg balanced usage of network resources, etc.

The examples described herein use notation and concepts described in the applicant's co-pending application U.S. Ser. No. 08/921,649 of Aug. 27, 1997. The example shown in FIG. 4 comprises three classes: TDM, AVJ and Cell Ace with one instance of each class, labeled 401, 406 and 409 respectively. FIG. 4 comprises an Application Model (as disclosed in the patent applications referenced hereinabove) of the three instances. An application model comprises a set of objects which represents functionalities provided by real physical resources, without describing the specific implementation details of those underlying physical resources.

FIG. 4 illustrates relationships between the application model's components. The relationships are referred to herein as "links". Four types of link may exist:

Realizations. Herein, by the term realization, it is meant a relationship between an application model and an implementation model.

Behaviors. Herein, by the term behavior, it is meant a class which models a data transforming behavior in a physical resource, eg a network device, or a class in an application model which models a function represented by the application model.

Containment. Herein, by the term containment, it is meant a subordinate element (eg a managed object) of an application model, which is subordinate to a superior element (managed object) of the application model. An subordinate element which is contained by a superior element may be accessible through the superior element.

Bindings, eg, A data transfer link between the application model's components, which may be implemented by means of a physical link.

In a broadband connection planning problem, a solution to the problem may comprise a set of links and/or nodes forming a route between two nodes. A graph such as that shown in FIG. 4 may describe an Implementation Model detailing which nodes and/or links of the Application Model may be used to implement the connection. Possible routes of links existing between nodes shall be referred to herein as "physical links" and routes comprising a set of physical links selected during execution or as a result of executing the algorithm are called "logical links". Containment links 435 may be illustrated as lines between network nodes having a diamond shape at one end, denoting that a network node at the diamond end of the line contains a network node on another end of the line. A binding link between nodes may be illustrated by straight lines 436. A realization link 437 may be illustrated by dotted lines having an arrow at one end denoting that a node at the arrow end of the dotted line realizes a node at another end of the line. A behavior link 438 existing between two nodes may be illustrated by a horizontal line, each end of which is connected to one of the nodes and a vertical line near a center of the horizontal line is attached to a box indicating a nature of the behavior link. Links usually occur between end points of instances, the end points possibly representing ports on a switch for example.

A "port" is defined in recommendation G.805 as "a pair of uni-directional ports". A unidirectional port as defined in recommendation G.803 "represents the output of a trail termination source of a uni-directional link connection, or the input to a trail termination sink or uni-directional link connection". Logical ports exist within a network element and may have similar layer structures and characteristics as physical ports, but do not actually bind to any physical port externally to the network element. Logical ports may be bound to one card, or may float across a plurality of cards. The physical or logical ports of a card may all be of a same type, or several different types of port may be resident on a card, depending on the specific manufacture of the network element itself.

Specific physical or logical ports are represented in the specific implementation herein as end points. In this specification, the term "end point" is used to describe a port comprising a receive port, and (optionally) a transmit port.

In FIG. 4 TDM instance 401 appears at a top level of a class-level hierarchy and contains an E1 end point 402 and an RTA end point. 403. End points 402 and 403 are linked by an adapt behavior 404. End point 403 contains (423) an SS7 end point 407 and RTA end point 403 contains (424) an SS7 end point 406. End points 405 and 406 are linked by an adapt behavior 407, which is contained by adapt behavior 404.

Cell Ace instance 408 appears at a lower level in the class-level hierarchy than TDM instance 401 and contains an E1 end point 410 and an ATM end point 413. End points 410 and 413 are linked by an adapt behavior 420. E1 end point 410 contains (431) an SS7 end point 416. ATM end point 413 contains (432) an SS7 end point 417. End points 416 and 417 are linked by an adapt behavior 428, which is contained by adapt behavior 420.

AVJ instance 409 appears at the same level of the class-level hierarchy as Cell ace instance 408 and contains an ATM end point 412 and an. RTA end point 411. End points 412 and 411 are linked by adapt behavior 422. ATM end point 412 contains (433) an SS7 end point 415. RTA end point 411 contains (434) an SS7 end point 414. End points 414 and 415 are linked by an adapt behavior 430, which is contained by adapt behavior 422.

E1 end point 402 of TDM instance 401 is realized (418) by E1 end point 410 of Cell Ace instance 408. RTA end point 411 of AVJ instance 409 is realized (419) by RTA end point 403 of TDM instance 401. SS7 end point 405 of TDM instance 401 is realized (426) by SS7 end point 416 of cell ace instance 408. SS7 end point 414 of AVJ instance 409 is realized (427) by SS7 end point 406 of TDM instance 401. ATM end point 413 of Cell Ace instance 408 is linked by binding 421 to ATM end point 412 of AVJ instance 409. SS7 end point 417 of Cell Ace instance 408 is linked by binding 429 to SS7 end point 415 of AVJ instance 409.

Data describing the application model illustrated in FIG. 4 is preferably used as an input to the algorithm. As well as data describing the classes, instances and links relating to the Application Model, the input data may also comprise behavior rules and optional partial implementation rules for architecture instances which comprise pre-defined logical links. Additional input data may also be used, such as: end point types and capacities; protocol expansions; physical link capacities and end point type realization rules. Optionally, partial Implementation Models consisting of pre-defined logical links for architecture class instances may also be accepted as inputs to the algorithm. In the example of FIG. 4, the input in partial implementation model is trivial, ie it contains no pre-defined logical links.

Additionally, input to the algorithm should comprise a specified Application Model instance that is to be provisioned (typically at a top of the class level hierarchy), ie the connection problem to be solved. In the example given in FIG. 4, the specified instance to be provisioned comprises TDM instance 401. The TDM instance's E1 end point 402 and RTA end point 403 and the adapt behavior 404 between them must be provisioned, and also the two SS7 end points 405 and 406 and the adapt behavior 407 between them. The end points are preferably provisioned by realizing them, ie constructing a sequence of behaviors between the realizing end points and so on as described hereinbelow. In the example, the sequence of behaviors constructed may be:

adapt o adapt corresponding to behavior rule:

adapt=adapt o adapt

The Cell Ace instance 408 and AVJ instance 409 have equipment models and do not require provisioning.

Figure 5:
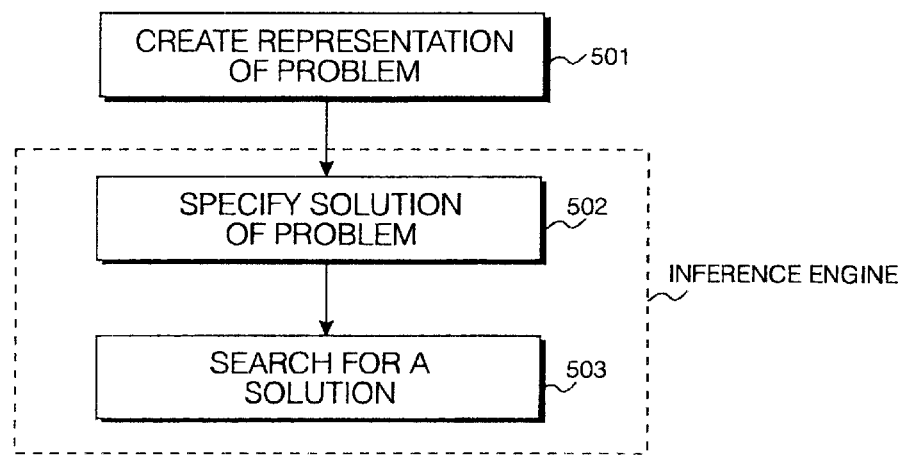
FIG. 5 illustrates schematically an algorithm according to the preferred embodiment comprising a create representation step, a specify solution step and a search for solution step.

FIG. 5 of the accompanying drawings illustrates steps typically executed by the algorithm when attempting to solve a broadband connections planning problem. At step 501 a representation of the problem is created, preferably the problem representation comprises the syntactical representation as described herein and is stored in the network controller's data storage. Data comprising a list of one or more clauses may be entered into an inference engine. After the algorithm has created the representation the inference engine is applied to the representation in order to attempt to find a solution to the problem. An inference engine may comprise rules or an algorithm intended to solve a given problem, preferably by producing inferences based on facts and rules, such as those described by the syntactic representation. The inference engine preferably comprises two parts: a logic component and a control component. At step 502 the inference engine's logic component specifies what it means to solve the problem, ie defining how to provision an instance. At step 503 the inference engine's control component describes how the logic component will be executed, ie how it will be used to search for the specified solution.

The representation of a broadband connections planning problem created at step 501 may comprise the following data:

classes, each declared as either equipment or architecture (corresponding to equipment and architecture models as described in the patent applications referenced hereinabove) and placed in the class-level hierarchy
end points with unique identifiers
end point types and capacities
physical links (defined explicitly or implicitly)
logical links selected from the physical links
behavior rules of the form $b=b_1 \, o \, \ldots \, o \, b_N$ wherein the o operator denotes composition of behaviors and corresponds to a binding between behavior end points. Families of behavior rules may be defined implicitly In the preferred embodiment, models, physical links, behavior rules and other information describing an Application Model and a connection planning problem to be solved by the algorithm may be represented textually as clauses. Clauses, in particular Horn clauses, form the basis of Prolog, a known logic programming language (see, for example, Ivan Bratko, "Prolog: Programming for Artificial Intelligence" second edition, Addison Wesley, 1990). The preferred embodiment's syntactical representation comprises a substantially Prolog-like syntax (preferably with convenient extensions such as $S=\{t(X)|p(X)\}$ for set construction). The syntactical representation is not necessarily a Prolog program; it preferably comprises data describing a formalism to which the algorithm's inference engine, as described hereinbelow will be applied.

Clauses may be one of three types: facts, rules and questions. Each clause usually terminates with a full stop (.). Facts declare things that are unconditionally true, for example:

network (atm)

declares that an object atm is always a network object. Each clause may comprise at least one object called a "term". In the example above, atm comprises a term. A term beginning with a lower case letter may be considered to be a constant (or an "atom"). Terms beginning with capital letters may be considered to be variables. A term inside a clause's brackets may be called an "argument" and a term prefixing the brackets a "functor".

A rule preferably comprises a condition part (on a right hand side of a :- symbol) and a conclusion part (on the left hand side of the :- symbol). The conclusion part may be called a head of the rule clause and the condition part may be called a body of the rule clause. If the condition part is true then a logical consequence of this is that the conclusion part is true.

A question may comprise a clause having a variable which is unbound, ie has not been defined as having a specified value. A question may be answered by using an inference engine algorithm which utilizes facts and rules defined to substitute the variable with another object. In a question comprising one or more unbound variable, each unbound variable may be selected as a goal, therefore all goals within a question should be satisfied. To satisfy a goal means to demonstrate that the goal logically follows from facts and rules defined.

Variable substitution primarily involves term matching. Two terms match if they are identical or if variables in both terms can be substituted with objects in such a way that after the substitution of variables the terms become identical. Conventionally in Prolog matching of goals occurs in a left to right order of terms appearing in a clause. The preferred embodiment uses a more sophisticated goal selection process as described hereinbelow.

The syntactical representation may specify a class by the following clause:

class_info (Class, Type, Level)

wherein Type may be either equipment or architecture, indicating that the class belongs to the implementation model or application model respectively; Class comprises an alpha-numeric identifier for the class and Level comprises an integer denoting the class's position in the class-level hierarchy (0 denoting a highest level usually). Thus, the class_info clauses for the example shown in FIG. 4 may be:

class_info (TDM, architecture, 0) representing the TDM class of the Application Model class_info (Cell_Ace, equipment, 1) representing the Cell Ace class class_info (AVJ, equipment, 1) representing the AVJ class The syntactical representation's clause for an end point preferably comprises:

endpoint (Class, Instance, Id)

wherein Class to which the end point being representing by the clause belongs; Instance may comprise an identifier term for the end point's class instance and Id may be an integer which is unique to the class, making the endpoint clause a unique identifier for each end point in the problem. Alternatively, Id may be an actual identifier generated by the network controller.

The syntactical representation may also include capacity data for end points, for consistency checking of bindings or for behavior rule and physical link schemata. The end point and capacity data may be represented by the following clause:

class_endpoint (Class, Id, Type, Capacity)

wherein Class, Id and Type may be as in an endpoint clause and Capacity may be an integer describing a capacity of the end point being represented by the clause, for example representing bandwidth capacity. The algorithm may take into account capacity usage of end points by other connections when computing a connection plan for the specified instance.

Thus, for the problem illustrated in FIG. 4 the class endpoint clauses may be:

class_endpoint(tdm, 1, e1, 0) for end point 402
class_endpoint(tdm, 2, a, 0) for end point 403
class_endpoint(tdm, 3, ss7, 0) for end point 405
class_endpoint(tdm, 4, ss7, 0) for end point 406
class_endpoint(cell_ace, 1, e1, 0) for end point 410
class_endpoint(cell_ace, 2, atm, 0) for end point 413
class_endpoint(cell_ace, 3, ss7, 0) for end point 416
class_endpoint(cell_ace, 4, ss7, 0) for end point 417
class_endpoint(avj, 1, rta, 0) for end point 412
class_endpoint(avj, 2, rta, 0) for end point 411
class_endpoint(avj, 3, rta, 0) for end point 415
class_endpoint(avj, 4, rta, 0) for end point 414

End point types may be used by the algorithm to check for consistency of end point containment rules. End point types may be used in a physical link schemata, for example for implicitly specifying behaviors between all end points of a same time in a given class.

An instance's end point in the Application Model may be given in the syntactical representation by the following clause:

t(Class, Instance, Id)

wherein Class is preferably the instance's class; Instance is the class instance which the end point represented by the clause occurs and Id represents the identifier of the end point.

The syntactical representation's clause for a physical link may be as follows:

link (T1, T2, Behavior)

wherein Behavior may be one of realize, bind, contain or a specific behavior prefixed by a hyphen (-) representing a type of the link, ie ITS nature, that is a capability or function, of the link between end points T1 and T2. Thus, for the example illustrated in FIG. 4, the link clauses may comprise:

link(t(tdm, 1, 1), t(tdm, 1, 2), -adapt) for adapt behavior 404 between end points 402 and 403
link(t(tdm, 1, 3), t(tdm, 1, 4), -adapt) for adapt behavior 407 between end points 405 and 406
link(t(tdm, 1, 1), t(cell_ace, 1, 1), realize) for realize link 418 between end points 402 and 410
link(t(tdm, 1, 2), t(avj, 1, 2), realize) for realize link 419 between end points 403 and 411
link(t(avj, 1, 1), t(avj, 1, 2), -adapt) for adapt behavior 422 between end points 412 and 411
link(t(avj, 1, 3), t(avj 1, 4), -adapt) for adapt behavior 430 between end points 415 and 414
link(t(cell_ace, 1, 1), t(cell_ace, 1, 2), -adapt) for adapt behavior 420 between end points 410 and 413
link(t(cell_ace, 1, 3), t(cell_ace, 1, 4), -adapt) for adapt behavior 428 between end points 416 and 417
link(t(cell_ace, 1, 2), t(avj, 1, 1), bind) for bind link 421 between end points 413 and 412
link(t(tdm, N, 1), t(tdm, N, 3), contain) for contain link 423 between end points 402 and 405
link(t(tdm, N, 2), t(tdm, N, 4), contain) for contain link 424 between end points 403 and 406
link(t(cell_ace, N, 1), t(cell_ace, N, 3), contain) for contain link 431 between end points 410 and 416
link(t(cell_ace, N, 2), t(cell_ace, N, 4), contain) for contain link 432 between end points 413 and 417
link(t(avj, N, 1), t(avj, N, 3), contain) for contain link 433 between end points 412 and 415
link(t(avj, N, 2), t(avj, N, 4), contain) for contain link 434 between end points 411 and 414

Symmetric rules (which include most binding and behavior links) require two clauses. For example:

link (t(tdm, 1, 1), t(tdm, 1, 2), -adapt
link (t(tdm, 1, 2), t(tdm, 1, 1), -adapt For broadband connections planning problems of a realistic size it may be impractical to explicitly enter data describing all physical links. Therefore, physical links may be defined implicitly: for example using a physical link schema for physical link behaviors in an instance with an unlimited number of end points, any two of which may be linked by a trivial behavior (which has no effect upon data carried):

link(t(atm_switch, N, A), t(atm_switch, N, B),-trivial):- integer(A), integer(B)

wherein integer generates an unbounded series of integers. Alternatively, instead of integer a predicate may be used which interrogates a database stored by the network controller in order to obtain an end point identifier. Other possible uses may include:

Handling realizations between contained end points: if T1 physically realizes T2, T1 contains T3 and T2 contains T4, then T3 physically realizes T4. Adding a rule describing this realization and containment links to a link clause may be achieved by only explicitly specifying realizations between end points at tops of containment links.

Grouping sets of instances by location, allowing physical links between any two end points with matching types at the same location.

Specifying only physical links between equipment end points.

Physical links between architecture end points may be implicit.

A logical link may be described by the syntactical representation by the following clause:

logical_link (T1, T2, Links, IM):- link (T1, T2, Link), add logical link (T1, T1, Link, IM)

wherein the link term may represent a physical link selected for inclusion in the logical link being represented by the clause (which may be considered as a first/head link in a list of links); add_logical_link may be a term for adding subsequent links to the list which comprise the logical links and IM may be a term containing a variable for each possible pair of end points and each variable becomes bound when the two end points are assigned a logical link.

logical_link comprises a record of created logical links which is maintained during execution of the algorithm. The record is preferably backtrackable because logical links are removed on backtracking. When adding a logical link, other logical links must often be forbidden. For example, it is incorrect to select logical behaviors between end points T1 and T2 and between T3 and T4, where T1 contains T3 and T4 contains T2. This relationship may be referred to as "No Klein Bottle Rule" and may be implemented by binding appropriate IM variables to a special term forbidden. As variable bindings are used for forbidding logical links, these correctly become re-enabled upon backtracking.

A consequence of using variable bindings to represent logical links is that no two end points may be linked by more than one kind of logical link simultaneously, though on backtracking different links may be assigned. Another consequence is that the algorithm can "create" the same logical link more than once without ill effect. This property allows a partial Implementation Model to be specified as part of the broadband connections planning problem input, simply by creating predefined logical links.

The syntactical representation may describe behavior rules using the following clause:

behavior_rule (b,[b1, . . . , bN])

which may represent the behavior b=b$_1$ o . . . o b$_N$ wherein the o operator denotes composition of behaviors, and corresponds to a binding between end points. The trivial behavior may be defined as:

b=trivial o b=b o trivial

The behavior_rule clause may be generalized to include operators corresponding to links other than bindings. The behaviors b1 . . . b$_N$ may also be compound terms containing parameters as arguments.

Families of behavior rules may be described by the syntactical representation by clauses such as the following:

behaviour_rule (B, [B\Bs]): -behvaior_rule_generator (B, Bs).

behaviour_rule (B, [trivial\Bs]): B\=trivial behavior_rule (B, Bs)

behaviour_rule_generator(B, ☐): -behavior rule generator (B, [B\Bs])

These clauses may generate an unbounded number of behaviorals such as:

adapt=adapt adapt=adapt o adapt adapt=adapt o trivial o adapt . . .

These clauses may be generalized to handle other operators and rules.

The input to the algorithm also includes the specific instance to be provisioned, ie a goal of the broadband connections planning problem. The syntactical representation of the problem's goal may be:

provision_instance (T1, T2, B, IM).

wherein T1 and T2 are bound to end points on the same instance: B to a behavior and IM is unbound. Solving the goal binds IM to a representation of the implementation model.

The syntactical representation of the specific instance to be provisioned in the example of FIG. 4, ie end points 1 and 2 of tdm instance 401, may be:

:- provision_instance (t(tdm, 1, 1), t(tdm, 1, 2), adapt, IM)

Once the syntactical representation of the problem has been created and input into the algorithm, a syntactical representation specifying what it means to solve the problem may be created by the algorithm at step 502 by the inference engine's logic component. The specification is preferably a recursive description of what it means to provision an instance, specifically two of its end points and a behavior link between them.

In order to solve the broadband connection planning problem, the specified instance must be provisioned down to equipment instances. Rules for provisioning are preferably:

To provision an instance: given two end points on an application model instance and a logical behavior between them:
  if the instance comprises equipment then the instance is provisioned
  otherwise the instance comprises architecture therefore provision the instance's behavior and two end points.

To provision a behavior: given a behavior B, realize its two end points by two other end points (T1, T2) and provision (T1, T2). Find a behavior rule B=B1 o . . . o B$_N$ and construct a sequence of logical behaviors B1 o . . . o B$_N$ and bindings between T1 and T2. Provision each new end point in the sequence.

To provision an end point: provision any end point contained by it, also if its Application Model class comprises architecture then realize the end points by another end point and provision that end point too.

The syntactical representation of the component may be as follows:

provision_instance(T1, T2, B, IM):
  T1=t(Class, Instance, Id1),
  class_info(Class, Type,_),
  logical_link(T1, T2, -B, IM),
  behavior_rule(B, Bs),
  provision_behavior(Type, Bs, T1, T2, IM)
  provision_behavior(equipment, Bs, T1, T2, IM)
  provision_behavior(architecture, Bs, T1, T2, IM):
    logical_ink(T1, T1R, realize, IM),
    logical_link(T2, T2R, realize, IM),
    construct_sequence(Bs, T1R, T2R, IM),
    provision_endpoints([T1R, T2R], IM).
    construct_sequence([Bs], T1, T2, IM)
p4 logical_link(T1, T2, -B, IM),
  construct_sequence([B\Bs], T1, T2, IM):
    logical_link(T1, TA, -B, IM),
    logical_link(TA, TB, bind, IM),
    provision_endpoints([TA, TB], IM),
    construct_sequence(Bs, TB, T2, IM)
    provision_endpoints(☐, IM).
    provision_endpoints([T\Ts], IM):
      provision_endpoints(T, IM),
      provision_endpoints(Ts, IM).
provision_endpoints(T, IM)
  T=t(Class, Instance, Id),
  class_info(Class, Type,_),
  realize_endpoint(Type, T, IM)
  Ts={TC\link(T, TC, contain)},
  provision_endpoints(Ts, IM).
  realize_endpoint(equipment, T, IM).
  realize_endpoint(architecture, T, IM):
    logical_link(T, T1, realize, IM),
    provision_endpoint(T1, IM).

At step 503 the inference engine's control component is used to execute the logic component. In the preferred embodiment, the algorithm utilizes artifical intelligence techniques which are intended to produce a more efficient solution to a given broadband connection and planning problem. The artificial intelligence techniques include:

Hierarchical planning: a planning problem may be decomposed into a hierarchy of sub-problems, the hierarchical planning principle solves higher level problems first, and treats those at lower levels as details to be solved later. This usually breaks down large problems into more tractable sub-problems. If a sub-problem has no solution then a way may be found to modify the higher level solutions. As a broadband connection planning problem as described according to the preferred embodiment has two natural hierarchies, the Application Model class level hierarchies and instance level provisioning hierarchies, these may be used as hierarchies by an algorithm incorporating the hierarchical planning principle. If a sub-problem has no solution them higher level solutions may be modified by backtracking.

First fail principle: during a search for a solution there is typically a conjunction of sub-goals to solve, each with a number of solutions, for example there may be several end points that must be bound to other (unspecified) end points. The first fail principle recommends selecting a sub-goal with the fewest solutions. This principle results in a higher probability of detecting early failure of the search. Two special cases of the first fail principle may be particularly beneficial:

if any sub-goal has no solutions, then select it and backtrack immediately. The benefits of this selection is that failure of a sub-problem should be detected as soon as possible to avoid wasted searches on other sub-problems.

if any sub-goal has exactly one solution, then select it. Selecting such a solution involves no arbitrary choices and therefore cannot lead to a combinatorial explosion, but may create new restrictions on other sub-goals which lead to earlier failure detection.

Hill-climbing: a more intelligent variant of a depth first search that may be used if an evaluation function is available. At each point in the search an evaluation function assigns a value to alternatives, based upon an estimate of how close the search is to its goal. The alternative with the closest estimate is selected. If backtracking occurs then a next best solution is tried, and so on until all solutions have been tried. The preferred embodiment can use the hill-climbing principle with an evaluation function based upon several criteria.

The preferred embodiment's algorithm preferably places a higher priority on the first fail principle than the hierarchical principle and hill-climbing may be applied orthogonally. The preferred embodiment of the algorithm's control component preferably uses two sets of rules using its execution: computation rules and selection rules.

Figure 6:
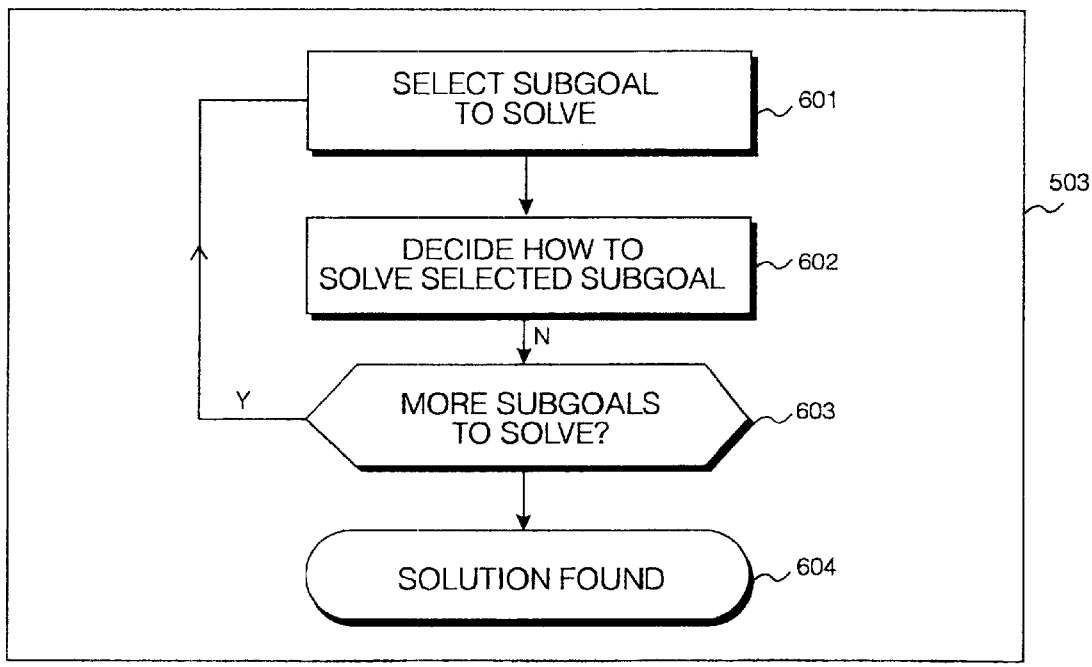
FIG. 6 illustrates schematically steps executed during the search for solution step identified in FIG. 5, including a select sub-goal step and a decide how to solve selected sub-goal step.

FIG. 6 of the accompanying drawings illustrates steps executed by the control component during step 503 of FIG. 5. At step 601 the control component uses its computation rule in order to select a sub-goal to solve. In logic programming terms a sub-goal may be an atom which is solved by matching it with a matching clause head, ie attempt to determine a set of values for variables in the sub-goal such that the truth of the sub-goal follows from the input clauses.

The computation rule decides an order in which sub-goals are solved, sub-goal order selection being dynamic, resulting in a co-routing strategy. The rules are chosen to avoid floundering, ie entering a deadlocked situation so that a situation wherein a conjunction of sub-goals of which none may be selected is preferably avoided.

At step 602 the control component decides how to solve the selected sub-goals using the selection rule. At step 603 a question is asked whether more sub-goals are to be solved in order to solve the specified overall broadband connection problem. This may arise due to the recursive nature of the inference engine, requiring it to select all terms in a clause as sub-goals in order to solve the problem. If the question asked at step 603 is answered in the affirmative then control passes back to step 601, otherwise control passes on to step 604 wherein the solution found may be returned as an output of the algorithm.

Figure 7:
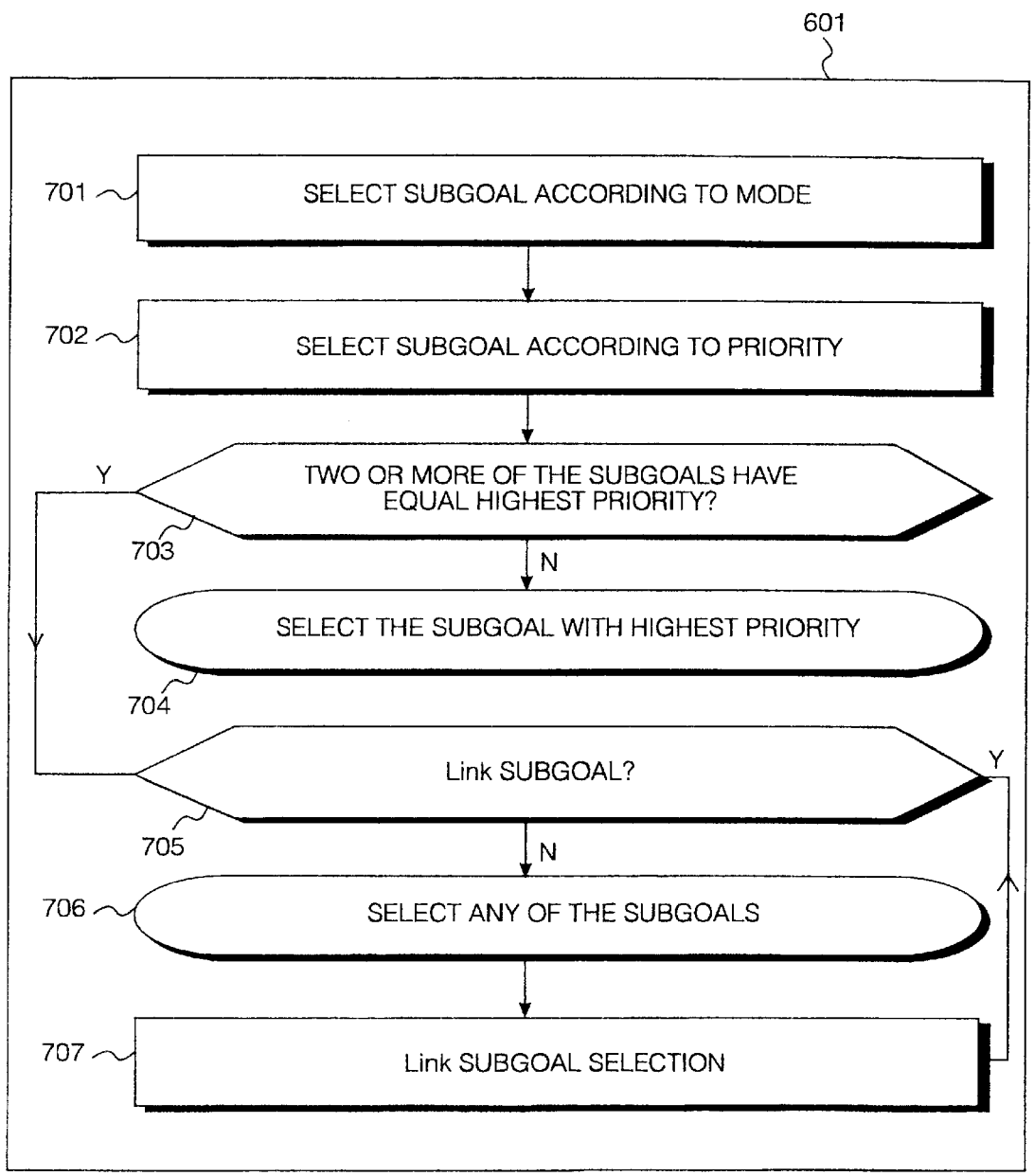
FIG. 7 illustrates schematically steps performed during the select sub-goal to solve step of FIG. 6, including a select sub-goal according to mode and priority steps and a link sub-goal selection step.

FIG. 7 of the accompanying drawings illustrates the steps executed by the computation rule during step 601 of FIG. 6. At step 701 a sub-goal may be selected according to its mode, the mode being as described hereinbelow. At step 702 a sub-goal may be selected according to its priority, the priority being as described hereinbelow. At step 703 a question is asked whether selected sub-goals have equal priority. If the question asked at step 703 is answered in the negatative then control is passed to step 704 wherein a sub-goal with a highest priority value is selected. If the question asked at step 703 is answered in the affirmative, the control is passed on to step 705. At step 705 the question is asked whether the selected sub-goals comprise a link sub-goal. If the question asked at step 705 is answered in the affirmative, then any (random) sub-goal from the selected sub-goals may be selected. If the question asked at step 705 is answered in the negative then control is passed on to step 707, wherein a link sub-goal selection process may be executed.

FIG. 8 of the accompanying drawings shows the modes and priorities of sub-goals which may arise during execution of the algorithm. Modes are denoted by underlining arguments. A sub-goal may be selected if its underlined arguments are non-variables and its doubly underlined arguments are ground terms; states of its other arguments may not be considered. Priorities may be used to select among sub-goals if several may be selectable, a sub-goal with a highest priority value usually being selected first.

| Priority | Subgoal and mode |
|---|---|
| 4 | provision_instance (T1, T2, B, IM) |
| 4 | behavior_rule (B, Bs) |
| 4 | behavior_rule_generator (B, L) |
| 3 | link (T1, T2, Link) |
| 3 | link (T1, T2, Link) |
| 3 | link (T1, T2, Link) |
| 2 | class_info (Class, Type, Level) |
| 2 | logical_link (T1, T2, Link, IM) |
| 2 | provision_endpoints (L, IM) |
| 2 | provision_endpoint (T, IM) |
| 2 | realize_endpoint (Type, T, IM) |
| 2 | provision_behavior (Type, Bs, T1, T2, IM) |
| 2 | construction_sequence (Bs, T1, T2, IM) |
| 2 | add_logiclink (T1, T2, Relation, IM) |
| 2 | X = Y |
| 2 | X\ = Y |
| 1 | integer (Id) |

Figure 9:
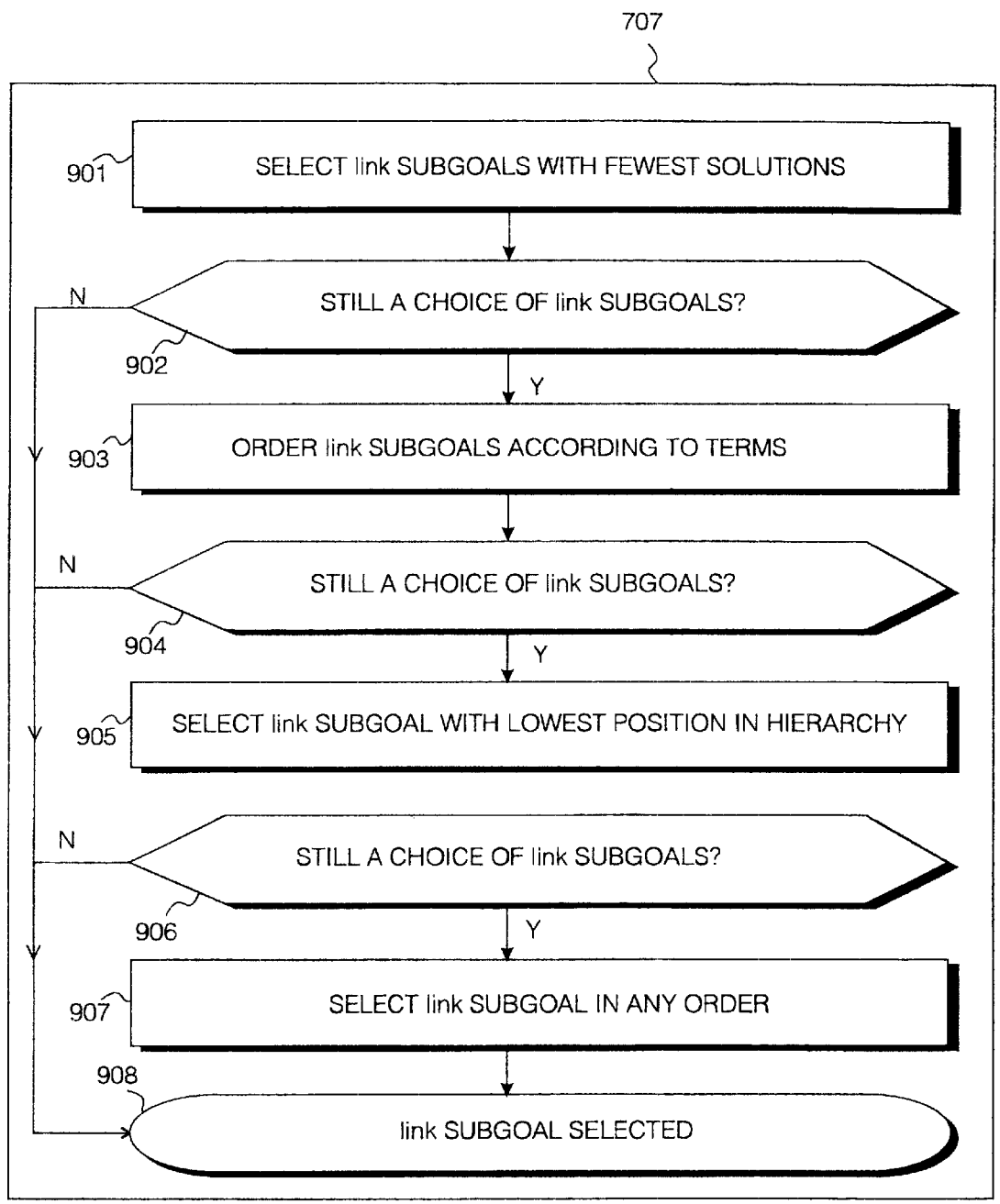
FIG. 9 illustrates steps performed during the link sub-goal selection step of FIG. 7.

FIG. 9 of the accompanying drawings illustrates steps preferably executed by the algorithm during link sub-goal selection step 707 of FIG. 7. At step 901 a link sub-goal with fewest solutions is selected. This selection is an application of the first fail principle. The selection preferably takes into consideration physical link schemata as these are usually executed in order to find all solutions, therefore it is not sufficient to merely count a number of matching clauses.

At step 902 the question is asked whether there is still a choice of link sub-goals. If the question asked at step 902 is answered in the affirmative then control is passed on to step 903. At step 903 the algorithm preferably selects the link sub-goal in an order based on a value of their link argument. The order of preference may be:- Behaviour, binding, contain, realization. This selection is an application of the hierarchical planning principle, which postpones solving sub-problems low in the provisioning hierarchy and also those low in the containment hierarchy.

At step 904 the question is asked whether there is still a choice of link sub-goals. If the question asked at step 904 is answered in the affirmative then control is passed on to step 905. At step 905 then the link sub-goal with a lowest position in the class-level hierarchy, as specified by its class_info clause is selected. The position may be calculated by summing depths of the link's end points' instances in the class-level hierarchy (the top level having depth 0). This selection is another application of hierarchical planning.

At step 906 a question is asked whether there is still a choice of link sub-goals. If the question asked at step 906 is answered in the affirmative then control is passed on to step 907. At step 907 the link sub-goal may be selected in any (random) order and control is passed onto step 908.

If a question asked at any one of steps 902, 904 or 906 is answered in the negative then control is passed onto step 908. At step 908 the link sub-goal selected before control was passed to step 908 may be returned as an output of link sub-goal selection step 707.

Figure 10:
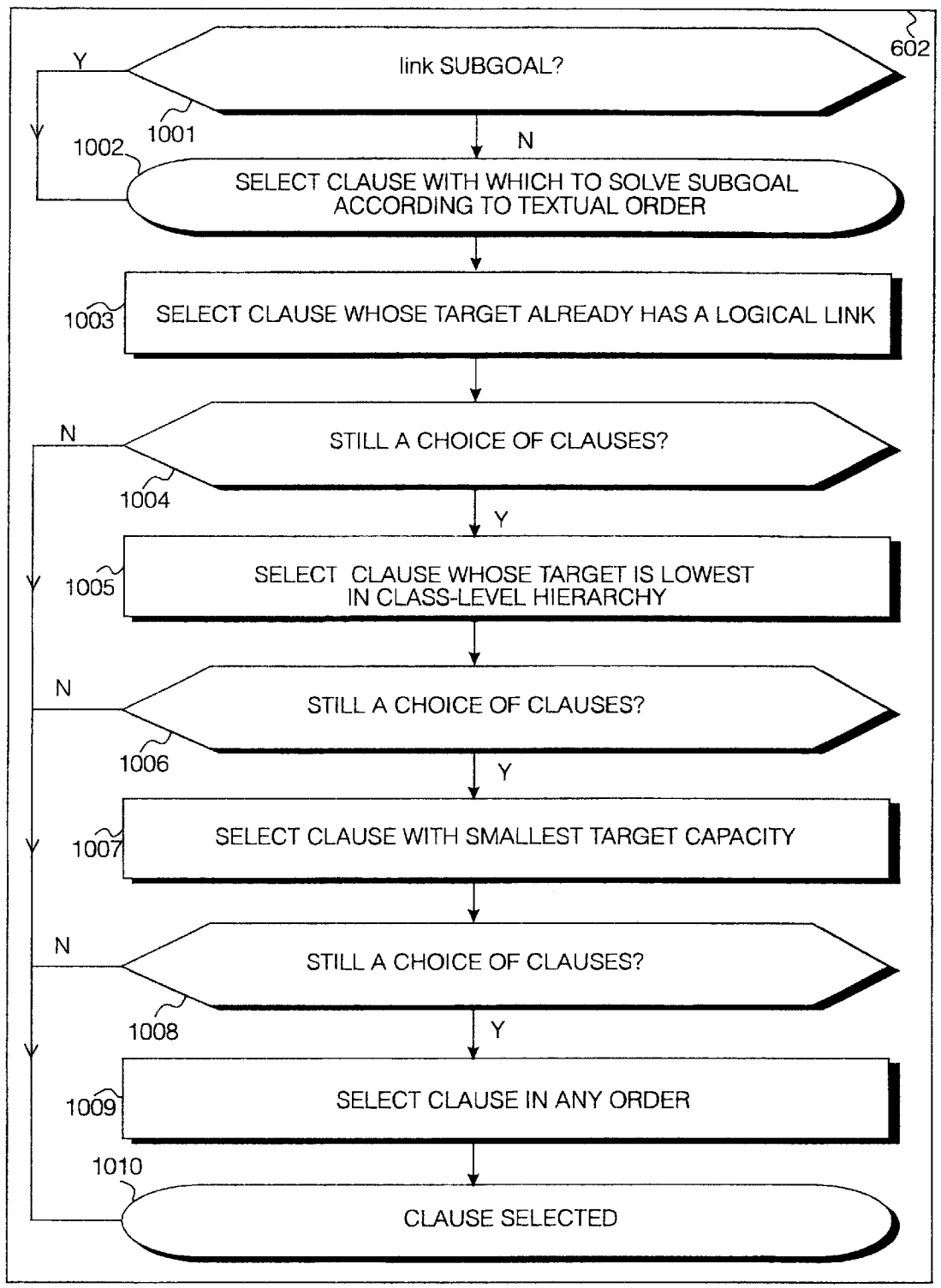
FIG. 10 illustrates steps performed during the decide how to solve selected sub-goal step of FIG. 6.

FIG. 10 of the accompanying drawings illustrates steps preferably executed by the algorithm's selection rule when it decides how to solve the selected sub-goal at step 602 of FIG. 6. The algorithm decides how to solve the selected sub-goal by choosing a clause which has a term comprising the sub-goal. At step 1001 a question is asked whether a selected sub-goal is a link sub-goal. If the question asked at step 1001 is answered in the negative then control is passed on to step 1002. At step 1002 a clause which the algorithm select in order to attempt to solve the sub-goal is chosen according to its textual order, ie its position in the algorithm's input clause list. The result of step 1002 may then be returned as an output of step 602.

If the question asked at step 1001 is answered in the affirmative then control is passed to step 1003. At step 1003 an unbound argument of the link sub-goal is selected. The unbound argument may be called a "target". A clause whose target already has a logical link is preferably selected.

At step 1004 a question is asked whether there is still a choice of clauses. If the question asked at step 1004 is answered in the affirmative then control is passed on to step 1005. At step 1005 a clause whose target is lowest in the class-level hierarchy is selected. This selection is an application of the hill-climbing principle which aims to achieve provisioning with as few instances as possible.

At step 1006 a question is asked whether there is still a choice of clauses. If the question asked at step 1006 is answered in the affirmative then control is passed on to step 1007. At step 1007 a clause whose target capacity is smallest is selected. This selection is another application of the hill-climbing principle which aims to minimize wasted end point capacity.

At step 1008 a question is asked whether there is still a choice of clauses. If the question asked at step 1008 is answered in the affirmative then control is passed on to step 1009. At step 1009 a clause is selected in any (random) order and control is passed on to step 1010.

If any one of the questions asked at step 1004, 1006 or 1008 is answered in the negative, control is passed on to step 1010. At step 1010 the clause selected by the algorithm before control was passed on to step 1010 may be returned as an output of step 602.

There follows a condensed trace showing how the example of FIG. 4 entered into the algorithm in the syntactical representation described hereinabove may be solved. For simplicity, the trace does not demonstrate the algorithm's selection rule, nor all the artificial intelligence techniques used to guide the inference engine's search, but it does illustrate the co-routing nature of the computation rule, interleaving of logical link selection and behavior rule construction. However, it will be appreciated by those skilled in the art that the algorithmic steps illustrated with reference to FIG. 7, FIG. 9 and FIG. 10 hereinabove could be implemented and demonstrated using a substantially similar trace technique. For readability, some intermediate steps have been omitted from the trace, again, those skilled in the art will appreciate that these details may be inferred from material disclosed. Herein variable IM which contains the algorithm's representation of the Implementation Model is shown as an unbound variable (for brevity) but its contents shall be summarized whenever they change (whenever an add_logical_link sub-goal is solved).

The trace preferably starts with initial goal (to provision tdm instance 401):

provision_instance (t(tdm, 1, 1), t(tdm, 1, 2), adapt, IM) and no logical links in IM (IM=☐). Select provision_ instance (more precisely, resolve atom with that predicate symbol):

class_info (tdm, Type,_),

T1=t(tdm, 1, Id1),

T2=t(tdm, 1, Id2), logical_link(T1, T2, -B, IM), behavior_rule(B, Bs), provision_behavior(type, Bs, T1, T2, IM), provision_endpoints([T1, T2], IM), Select class_info,=(twice), logical_link, behavior_rule, provision_endpoints:

link(t(tdm, 1, Id1), t(tdm, 1, Id2), -B), add_logical_link(t(tdm, 1, Id1), t(tdm, 1, Id2), -B, IM), behavior_rule_generator (B, BS1), provision_behavior(architecture, [B\Bs 1], t(tdm, 1, Id1), t(tdm, 1, ID2), IM)

provision_endpoint(t(tdm, 1, ID1), IM), provision_endpoint(t(tdm, 1, ID2), IM), Now there is a behavior_rule_generator sub-goal which cannot yet be solved because its list in unbound. The algorithm is guided by logical links but each logical link is immediately tested for consistency against the partially-constructed behavior rule, which is currently:

B=Bo Bs1 where B and Bs1 are unbound.

Now select link and provision_behavior add_logical_link(t(tdm, 1, 1), t(tdm, 1, 2), -adapt, IM), behavior_rule_generator (adapt, Bs1), logical_link(t(tdm, 1, 1), T1R, realize, IM)

logical_link (t(tdm, 1, 2), T2R, realize, IM), construct_sequence ([adapt\Bs1], T1R, T2R, IM), provision_endpoints ([T1R, T2R, IM), provision_endpoints (t(tdm, 1, 1), IM), provision_endpoints (t(tdm, 1, 2), IM).

Solving link has bound B to adapt so the behavior rule is now:

adapt=adapt o Bs1

Now select add_logical_link, logical_link (twice) and provision_endpoints:

behavior_rule_generator (adapt, Bs1),
    link(t(tdm, 1, 1), T1R, realize, IM),
    add_logical link(t(tdm, 1, 1), T1R, realize, IM),
    link(t(tdm, 1, 2), T2R, realize, IM),
    add_logical link(t(tdm, 1, 2), T2R, realize, IM),
    construct_sequence([adapt\Bs1], T1R, T2R, IM),
    provision_endpoint(T1R, IM),
    provision_endpoint(T2R, IM),
    provision_endpoint(t(tdm, 1, 1), IM),
    provision_endpoint(t(tdm, 1, 2), IM).

Since add_logical_link was solved there is now a non-empty IM:

t(tdm, 1, 1) adapt t(tdm, 1, 2)

which is the logical adapt behavior 404 between the endpoints 1 and 2 of TDM instance 401. Now select both link sub-goals:

behavior_rule_generator (adapt, Bs1),
    add_logical_link(t(tdm, 1, 1), t(cell_ace, 1, 1), realize, IM),
    construct_sequence([adapt\Bs1], t(cell ace, 1, 1), t(avj, 1, 2), IM),
    provision_endpoint(t(cell ace, 1, 1), IM),
    provision_endpoint(t(avj, 1, 2), IM),
    provision_endpoint(t(tdm, 1, 1), IM),
    provision_endpoint(t(tdm, 1, 2), IM),
    provision_endpoint(t(avj, 1, 2), IM),
    provision_endpoint(t(tdm, 1, 1), IM),
    provision_endpoint(t(tdm, 1, 2), IM)

The IM is now:

t(tdm, 1, 1) adapt t(tdm, 1, 2)
    t(tdm, 1, 1) realize t(cell ace, 1, 1)
    t(tdm, 1, 2) realize t(avj, 1, 2)
    t(cell ace, 1, 1) adapt t(cell_ace, 1, 2)

Select add logical link and construct_sequence:

behavior_rule_generator(adapt, [B]),
    provision_endpoint(t(cell ace, 1, 2), IM),
    provision_endpoint(t(avj, 1, 1), IM),
    logical_link(t(avj, 1, 1), t(avj, 1, 2), -B, IM),
    provision_endpoint(t(cell_ace, 1, 1), IM),
    provision_endpoint(t(avj, 1, 2), IM),
    provision_endpoint(t(tdm, 1, 1), IM),
    provision_endpoint(t(tdm, 1, 2), IM)

The current behavior rule is now:

adapt=adapt o B and the IM is now:

t(tdm, 1, 1) adapt t(tdm, 1, 2)
    t(tdm, 1, 1) realize t(cell_ace, 1, 1)
    t(tdm, 1, 2) realize t(avj, 1, 2)
    t(cell_ace, 1, 1) adapt t(cell_ace, 1, 2)
    t(cell_ace, 1, 2) bind t(avj, 1, 1)

Select logical_link and behavior_rule_generator provision_endpoint(t(cell_ace, 1, 2), IM),
    provision_endpoint(t(avj, 1, 1), IM),
    link(t(avj, 1, 1), t(avj, 1, 2, -adapt),
    add_logical link (t(avj, 1, 2), -adapt, IM),
    provision_endpoint(t(cell_ace, 1, 1), IM),
    provision_endpoint(t(avj, 1, 2), IM),
    provision_endpoint(t(tdm, 1, 1), IM),
    provision_endpoint(t(tdm, 1, 2), IM).

The behavior rule is now completely constructed:

adapt=adapt o adapt

Select add_logical_link and link:

provision_endpoint(t(cell_ace, 1, 2), IM),
    provision_endpoint(t(avj, 1, 1), IM),
    provision_endpoint(t(cell_ace, 1, 1), IM),
    provision_endpoint(t(avj, 1, 2), IM),
    provision_endpoint(t(tdm, 1, 1), IM),
    provision_endpoint(t(tdm, 1, 2), IM).

The IM is now:

t(tdm, 1, 1) adapt t(tdm, 1, 2)
    t(tdm, 1, 1) realize t(cell-_ace, 1, 1)
    t(tdm, 1, 2) realize t(avj, 1, 2)
    t(cell_ace, 1, 1) adapt t(cell_ace, 1, 2)
    t(cell_ace, 1, 2) bind t(avj, 1, 1)
    t(avj, 1, 1) adapt t(avj, 1, 2)

since the class type of each of the cell_ace and avj instances is equipment, all the sub-goals may be solved except:

provision_endpoint(t(tdm, 1,1))
    provision_endpoint(t(tdm, 1, 2))

Solving these sub-goals leads to the contained endpoints t(tdm, 1, 3) and t (tdm, 1, 4). The logical behavior adapt is found between them and they are provisioned exactly as above, except that no further endpoint and the TDM has been provisioned with the following Implementation Model, which for the example of FIG. 4 comprises all physical links selected as logical links:

| IM | link's label in FIG. 4 |
|---|---|
| t (tdm, 1, 1) adapt t (tdm, 1, 2) | 404 |
| t (tdm, 1, 1) realize t (cell_ace, 1, 1) | 418 |
| t (tdm, 1, 2) realize t (avj, 1, 2) | 419 |
| t (cell_ace, 1, 1) adapt t (cell_ace, 1, 2) | 420 |
| t (cell_ace, 1, 2) bind t (avj, 1, 1) | 421 |
| t (avj, 1, 1) adapt t (avj, 1, 2) | 422 |
| t (tdm, 1, 1) contain t (tdm, 1, 3) | 423 |
| t (tdm, 1, 2) contain t (tdm, 1, 4) | 424 |
| t (tdm, 1, 3) adapt t (tdm, 1, 4) | 407 |
| t (tdm, 1, 3) realize t (cell_ace, 1, 3) | 426 |
| t (tdm, 1, 4) realize t (avj, 1, 4) | 427 |
| t (cell_ace, 1, 3) adapt t (cell_ace, 1, 4) | 428 |
| t (cell_ace, 1, 4) bind (avj, 1, 3) | 429 |
| t (avj, 1, 3) adapt t (avj, 1, 4) | 430 |

Figure 11:
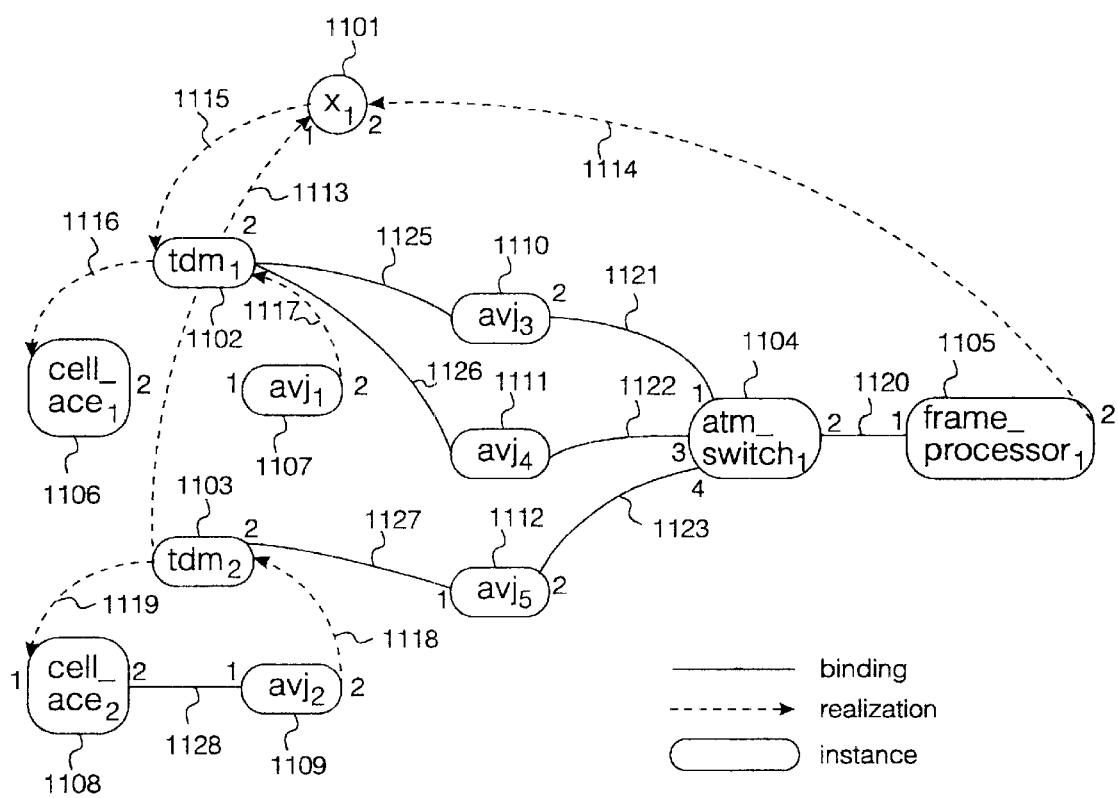
FIG. 11 illustrates a simplified Application Model.

There now follows a second example of the execution of the algorithm solving another broadband connection problem. FIG. 11 of the accompanying drawings illustrates: a graph which represents a simplified Application Model. All physical bindings and realizations for the Application Model are shown on the graph, although physical behaviors are not shown. To simplify the description of the diagram and the execution of the algorithm on a syntactical representation of the nodes and links shown in the graph, the following points should be noted:

behavior rules are ignored there is no end point containment, we assume that contained end points (for example those of type SS7) do not exist. End points are shown as numerals near class instances (shown as oval boxes). Again, realization links are illustrated as dotted lines with an arrow head and binding links are shown as solid lines.

The example of FIG. 11 comprises 6 classes: x, atm_switch, tdm, frame_processor, cell_ace and avj. Class x is at a top level of the class-level hierarchy; tdm, frame_processor and atm_switch are on a level under x and avj and cell_ace are on a third level below. A first instance of the x class 1101 may have its end point 1 realized (1115) by end point 1 of a first tdm instance 1102 and also realized (1113) by end point 1 of a second tdm instance 1103. End point 2 of x instance 1101 may be realized (1114) by end point 2 of frame_processor instance 1105.

End point 1 of tdm instance 1102 may be realized (1116) by end point 1 of a first cell_ace instance 1106. End point 2 of tdm instance 1102 may be realized (1117) by end point 2 of a first avj instance 1107. End point 1 of tdm instance 1103 may be realized (1119) by end point 1 of a second cell_ace instance 1108. End point 2 of tdm instance 1103 may be realized (1118) by end point 2 of a second avj instance 1109. End point 2 of cell_ace instance 1108 and end point 1 of avj instance 1109 are linked by binding 1128.

End point 1 of frame_processor instance 1105 is linked by binding 1120 to end point 2 of atm_switch instance 1104. End point 1 of atm_switch instance is linked to end point 2 of a third avj instance 1110 by binding 1121. End point 3 of atm switch instance 1104 is linked to end point 2 of a fourth avj instance 1111 by binding 1122. End point 4 of atm_switch instance 1104 is linked to end point 2 of a fifth avj instance 1112 by binding 1123.

End point 1 of avj instance 1110 is linked to end point 2 of tdm instance 1102 by binding 1125. End point 1 of avj instance 1111 is linked to end point 2 of tdm instance 1102 by binding 1126. End point 1 of avj instance 1112 is linked to end point 2 of tdm instance 1103 by binding 1127.

The syntactical representation of the application model shown in FIG. 11 may be substantially similar to the syntactical representation method described hereinabove. For example, clauses defining the example's classes may be as follows:

class_info (x, architecture, 0)
class_info (tdm, equipment, 1)
class_info (frame$_{13}$ processor, equipment, 1)
class_info (atm_switch, equipment, 1)
class_info (avj, equipment, 2)
class_info (cell_ace, equipment, 2)

It will be appreciated by those skilled in the art that end point definitions according to the preferred embodiment may also be created for nodes of FIG. 11, for example, end point 2 of the third avj instance 1110 may be represented by the following clause:

endpoint(avj, 3, 2)

Links between the nodes may also be created using the syntactical representation, for example, the realize link 1116 between end point 1 of the first tdm instance 1102 and end point 1 of the first cell_ace instance 1106 may be represented by the following clause:

link(t(tdm, 1, 1), t(cell_ace, 1, 1), realize)

FIGS. 12 to 15 of the accompanying drawings along with the corresponding description given hereinbelow will demonstrate the execution of the algorithm according to the preferred embodiment, including use of the artificial intelligence techniques such as first fail, hill-climbing and hierarchical planning. The result of the algorithm's execution will again be an Implementation Model (IM) comprising selected logical links, which may be expressed according to the syntactical representation.

Figure 12:
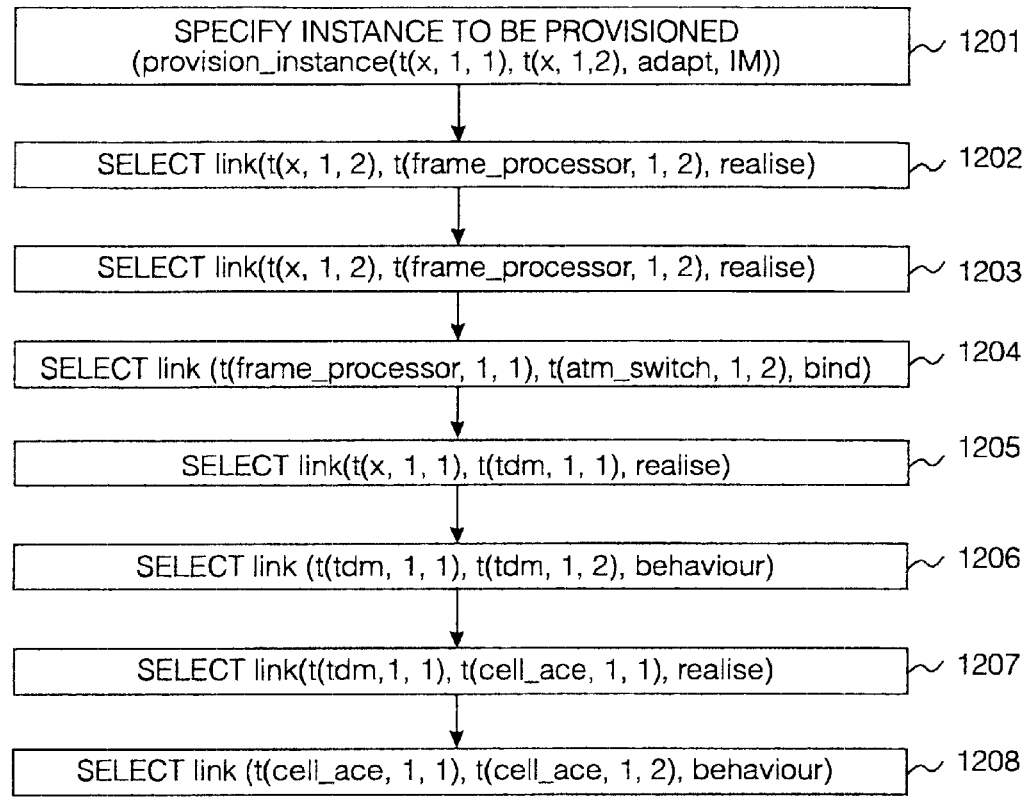
FIG. 12 illustrates schematically steps which may be performed by the preferred embodiment whilst solving a connection problem relating to the Application Model of FIG. 11.

FIG. 12 of the accompanying drawings illustrates steps which may be performed by the preferred embodiment of the algorithm whilst attempting to solve a broadband connection problem on the application model of FIG. 11 up to a first occurrence of the algorithm back-tracking. At step 1201 a provisioning instance to be solved is specified. In the following example, x instance 1101 will be provisioned. The syntactical representation of the specific instance to be provisioned may be given by the following clause:

provision_instance (t(x, 1, 1), t(x, 1, 2), adapt, IM)

x instance 1101 has two end points (numbered 1 and 2) which have a behavior link (not shown in FIG. 11). Both the end points should be realized in order to solve the broadband connections planning problem. End point 1 of x instance 1201 may be realized in two ways (ie by tdm instances 1106 and 1103), whereas end point 2 has only one possible realization (frame_processor instance 1105). The algorithm's application of the first fail principle causes end point 2 to be selected and realized by realization link 1114 to end point 2 of frame_processor 1105. This may be expressed in the syntactical representation by the following clause:

link (t(x, 1, 1), t(frame_processor, 1, 2), realize)

At step 1203 the algorithm's application of the first fail principle selects the behavior linking frame_processor instance's 1105 end points 1 and 2. This may be expressed as a logical link to be added to the algorithm's Implementation Model in the syntactical representation by the following clause:

link (t(frame_processor, 1, 2), t(frame_processor, 1, 1), behavior)

At step 1204 the algorithm's application of the first fail principle binds end point 1 of frame_processor instance 1105 to end point 2 of atm_switch instance 1104 using biding link 1120.

link (t(frame_processor, 1, 1), t(atm_switch, 1, 2), bind)

As atm_switch instance 1105 end point 2 has three possible behavior links (linking it with end points 1, 3 and 4 of atm_switch instance 1105). However, end point 1 of x instance 1101 has only two possible realizations (linking it to end point 1 of tdm instance 1102 or end point 1 of tdm instance 1103). The algorithm's application of the first fail principle therefore decides that end point 1 of the x instance is to be attempted to be provisioned, rather than end point 2 of atm_switch instance 1104. As the algorithm has no reason to select end point 1 of tdm instance 1102 over end point 1 of tdm instance 1103 or vice versa, the algorithm (randomly) selects end point 1 of tdm instance 1102, realized by realization link 1115.

link (t(x, 1, 1), t(tdm, 1, 1), realize)

At step 1206 the algorithm's application of the hill-climbing principle tries behaviors before bindings, so end points 1 and 2 of the tdm instance 1102 are linked by their behavior link:

link (t(tdm, 1, 1), t(tdm, 1, 2), behavior)

At step 1207 end point 2 of tdm instance 1102 has two possible bindings (to end point 1 of avj instance 1110 and end point 1 of avj instance 1111), so the algorithm's application of the first fail principle realizes (1116) end point 1 of tdm instance 1102 by end point 1 of cell_ace instance 1106:

link (t(tdm, 1, 1), t(class_instance, 1, 1), realize)

At step 1208 the algorithm's application of the first fail principle selects a behavior link linking end points 1 and 2 of cell_ace instance 1106:

link (t(cell_ace, 1, 1), t(cell_ace, 1, 2), behavior)

Figure 13:
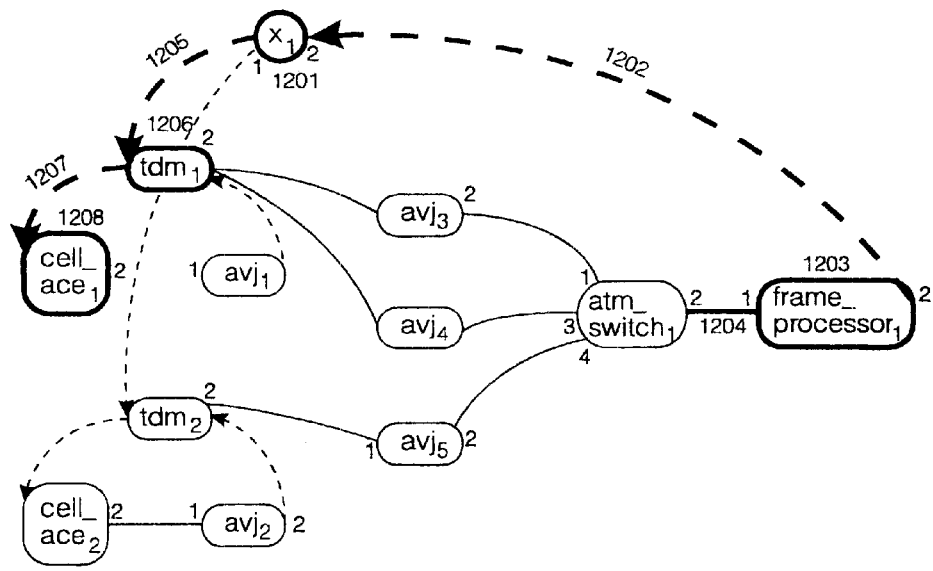
FIG. 13 illustrates execution of the steps of FIG. 12 on the Application Model of FIG. 11.

At this point, there are no possible bindings on end point 2 of cell_ace instance 1106, so the algorithm's application of the first fail principle causes immediate back-tracking. FIG. 13 of the accompanying drawings illustrates schematically steps 1201 to 1208 of FIG. 12 performed on the simplified Application Model of FIG. 11. Logical links selected are shown as emboldened physical links, apart from logical behaviors (between end points of a single instance) which are implied by emboldened instance boxes. Numerals 1201 to 1208 on FIG. 13 show the order of selection corresponding to the steps of FIG. 12.

Figure 14:
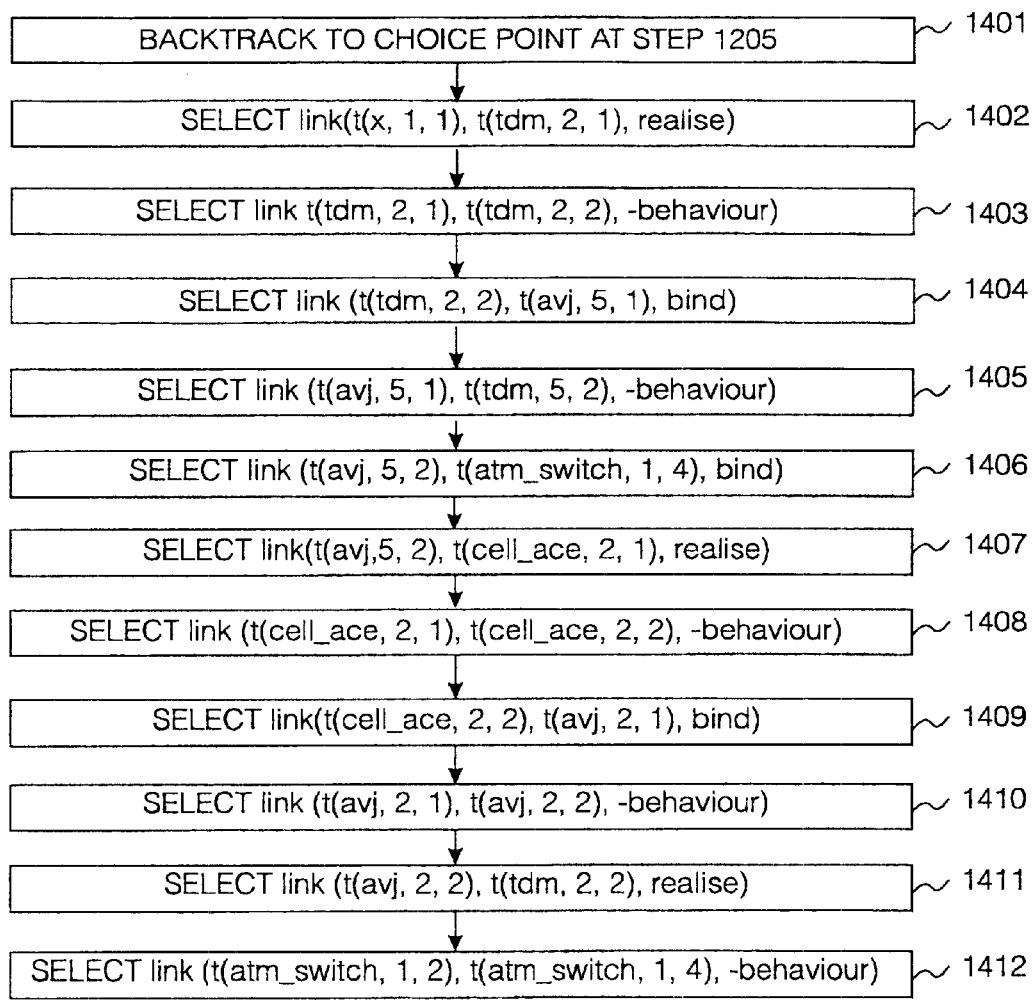
FIG. 14 illustrates further steps which may be executed by the preferred embodiment on the Application Model of FIG. 11.

FIG. 14 of the accompanying drawings illustrates the steps preferably executed by the algorithm following step 1208 of FIG. 12. At step 1401 the algorithm back tracks to a choice point occurring at step 1205. At step 1402 the algorithm tries an alternative realization of end point 1 of x instance 1101 by realizing (1113) the end point by end point 1 of tdm instance 1103:

link (t(x, 1, 1), t(tdm, 2, 1), realize)

At step 1403 the algorithm's application of the first fail principle links end points 1 and 2 of tdm instance 1103 by a behavior:

link (t(tdm, 2, 1), t(tdm, 2, 2), -behavior)

At step 1404 the algorithm's application of the hierarchical planning principle binds end point 2 of tdm instance 1103 to end point 1 of avj instance 1112 by binding link 1127:

link (t(tdm, 2, 2), t(avj, 5, 1), bind)

At step 1405 the algorithm's application of the hierarchical planning principle links end points 1 and 2 of avj instance 1112 by a behavior.

link (t(avj, 5, 1), t(avj, 5, 2), behavior)

At step 1406 the algorithm's application of the hierarchical planning principle binds end point 2 of avj instance 1112 to end point 4 of atm_switch instance 1104 by binding link 1123.

link (t(avj, 5, 2), t(atm_switch, 1, 4), bind)

At step 1407 the algorithm's application of the hierarchical planning principle delays provisioning of tdm instance 1103 in order to construct links to avj instance 1112 and atm_switch instance 1114. However, the algorithm's application of the first fail principle overrides its use of the hierarchical planning principle in this case and delays selection of a behavior linking atm_switch instance 1104 and instead provisions tdm instance 1103. End point 1 of tdm instance 1103 is realized (1119) by end point 1 of cell_ace instance 1108:

link (t(avj, 5, 2), t(atm_switch, 1, 4), bind)

At step 1408 the algorithm's application of the first fail and hierarchical planning principles link end points 1 and 2 of cell ace instance 1108 by a behavior:

link (t(cell_ace, 2, 1), t(cell_ace, 2, 2), behavior)

At step 1410 the algorithm's application of the first fail and hierarchical planning principles bind end point 2 of cell_ace instance 1108 to end point 1 of avj instance 1109 by binding link 1128:

link (t(cell_ace, 2, 2), t(avj, 2, 1), bind)

At step 1411 the algorithm's application of the first fail and hierarchical planning principles link end points 1 and 2 of avj instance 1109 by a behavior.

link (t(avj, 2, 1), t(avj, 2, 2), behavior)

At step 1411 the algorithm's application of the first fail principle realizes (1118) end point 2 of tdm instance 1103 by end point 2 of avj instance 1109.

link (t(avj, 2, 2), t(tdm, 2, 2), realize)

At step 1412 the only two end points which still require logical links are end points 2 and 4 of atm_switch instance 1104:

link (t(atm_switch, 1, 2), t(atm_switch, 1, 4), -behavior)

The algorithm's application of the hill-climbing principle selects a behavior between the two end points because the target already had a logical link. Without this heuristic different behaviors might have been invoked (eg linking end points 4 and 3 or end points 2 and 1 of the atm_switch instance 1104) causing the two ends of the specified instance to be provisioned to "miss" each other and leading to unnecessary back-tracking.

Figure 15:
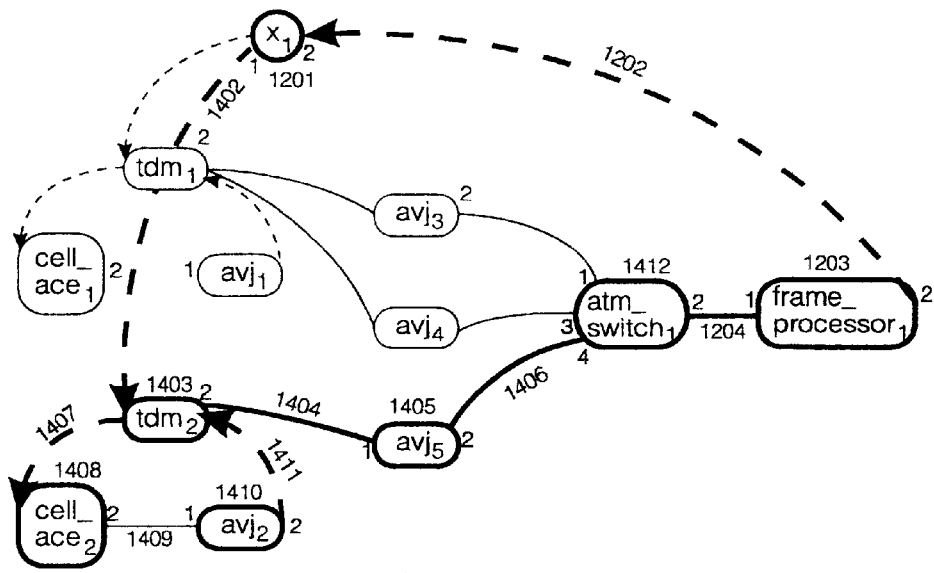
FIG. 15 illustrates execution of the steps of FIG. 14 on the Application Model of FIG. 11.

FIG. 15 of the accompanying drawings illustrates a trace of the execution of the algorithm in a manner similar to FIG. 13, including steps 1201 to 1205 of FIG. 12 and steps 1401 to 1412 of FIG. 14.

Thus, the Implementation Model resulting from the execution of the algorithm as described hereinabove may be as follows:

| IM | link's label in FIG. 11 |
|---|---|
| t (x, 1, 1) realize t (frame_processor, 1, 2) | 1114 |
| t (frame_processor, 1, 2) behavior t (frame_processor, 1, 1) | 1105 |
| t (frame_processor, 1, 1) bind t (atm_switch, 1, 2) | 1120 |
| t (x, 1, 1) realize t (tdm, 2, 1) | 1113 |
| t (tdm, 2, 1) behavior t (tdm, 2, 2) | 1103 |
| t (tdm, 2, 2) bind t (avj, 5, 1) | 1127 |
| t (avj, 5, 1) behavior t (avj, 5, 2) | 1112 |
| t (avj, 5, 2) bind t (atm_switch, 1, 4) | 1123 |
| t (avj, 5, 2) realize t (cell_ace, 2, 1) | 1119 |
| t (cell_ace, 2, 1) behavior t (cell_ace, 2, 2) | 1108 |
| t (cell_ace, 2, 2) bind t (avj, 2, 1) | 1128 |
| t (avj, 2, 1) behavior t (avj, 2, 2) | 1109 |
| t (avj, 2, 2) realize t (tdm, 2, 2) | 1118 |
| t (atm_switch, 1, 2) behavior t (atm_switch, 1, 4) | 1104 |

The logical links in the resulting implementation model could be displayed to a user, preferably via the network controller in any convenient form, for example a screen display highlighting the logical links on a graphical representation of the graph similar to that shown in FIG. 15 or alternatively a list of clauses in the syntactical representation describing the Implementation Model's solution. The resulting Implementation Model could also be used, for example, by a network controller to implement the logical links for connections in the physical network.

What is claimed is:

1. A method of producing a connection plan representing at least one connection between a plurality of end points in a class-level hierarchical network comprising a plurality of nodes and a plurality of links, each said node having at least one end point connecting it to a said link, each said link being between at least a pair of said endpoints, characterized by said link having a type, said connection plan comprising data describing a set of end points and data describing said types of said links between said end points, said method comprising the steps of:

creating a multi-class-level data representation of at least part of said network;

creating a data representation of said end points of said connection; and applying an algorithm utilizing artificial intelligence techniques to said data representations to generate said connection plan.

2. A method according to claim 1, wherein a said representation comprises a list of at least one clause, each said clause comprising at least one term.

3. A method according to claim 1, wherein a said representation comprises a list of at least one clause each said clause comprising at least one term, and said step of applying an algorithm to generate said connection plan comprises selecting (601) a said term of a said clause representing said connection as a sub-goal and recursively attempting to solve said sub-goal.

4. A method according to claim 3, wherein a said sub-goal is assigned a priority, and said algorithm selects (704) a said sub-goal with a highest said priority.

5. A method according to claim 3, wherein said algorithm selects (901) a said sub-goal which is a clause with fewest said terms.

6. A method according to claim 3, wherein said algorithm selects (903) a said sub-goal according to an order of its said terms.

7. A method according to claim 3, wherein a said algorithm selects (905) a sub-goal with a lowest position in said network hierarchy.

8. A method according to claim 3, wherein said algorithm selects (907) said sub-goal randomly.

9. A method according to claim 3, wherein said algorithm selects (1002) a said clause with which to solve said sub-goal according to a position of said clause in said list of clauses.

10. A method according to claim 3, wherein said algorithm selects (1003) a said clause with which to solve said sub-goal by selecting a said clause having a term included in said connection plan.

11. A method according to claim 3, wherein said algorithm selects (1005) a said clause with which to solve said sub-goal by selecting a clause which is lowest in said network hierarchy.

12. A method according to claim 3, wherein said algorithm randomly selects (1009) a clause with which to solve said sub-goal.

13. A method according to claim 2, wherein said clauses represent data describing features of said network, said features selected from the set:

classes of said network nodes;

end points of said network nodes; and links of said network.

14. A method according to claim 1, wherein said link types may be selected from the set:

binding;

realization;

behavior;

containment.

15. A method according to claim 1, further comprising the step of:

displaying a graphical representation (1201–1208, 1402–1412) of said connection plan.

16. A method according to claim 1, further comprising the step of:

implementing said connection plan as a connection in said network.

17. A method according to claim 1 wherein said representation comprises a Prolog syntax.

18. Connection planning apparatus for planning at least one connection in a class-level hierarchical network comprising a plurality of nodes and links, each said node having at least one end point connecting it to a said link, characterized by each said link between said end points having a type, said apparatus capable of creating a connection plan comprising a set of end points and said types of links between said end points, said apparatus comprising:

means for creating a multi-class-level data representation of at least part of said network;

means for creating a data representation of end points of said connection; and an inference machine comprising an algorithm which uses said data representations to generate said connection plan using artificial intelligence techniques.

19. Apparatus according to claim 18, wherein a said representation comprises a list of at least one clause, each said clause comprising at least one term.

20. Apparatus according to claim 19, wherein a said clauses comprises a horn clause.

21. Apparatus according to claim 19, wherein said inference engine selects (601) a said term of a said clause representing said connection as a sub-goal and recursively attempts to solve said sub-goal.

22. Apparatus according to claim 21, wherein a said sub-goal is assigned a priority, and said inference engine selects (704) a said sub-goal with a highest said priority.

23. Apparatus according to claim 21, wherein said inference engine selects (901) a said sub-goal which is a clause with a fewest said terms.

24. Apparatus according to claim 21, wherein said inference engine selects (903) a sub-goal according to an order of its said terms.

25. Apparatus according to claim 21, wherein said inference engine selects (905) a said sub-goal with a lowest position in said network hierarchy.

26. Apparatus according to claim 21, wherein said inference engine selects (907) said sub-goal randomly.

27. Apparatus according to claim 21, wherein said inference engine selects (1002) a said clause with which to solve said sub-goal according to a position of said clause in said list of clauses.

28. Apparatus according to claim 21, wherein said inference engine selects (1003) a said clause with which to solve said sub-goal by selecting said clause having a term included in said connection plan.

29. Apparatus according to claim 21, wherein said inference engine selects (1005 a said clause with which to solve said sub-goal by selecting a clause which is lowest in said network hierarchy.

30. Apparatus according to claim 21, wherein said inference engine randomly selects (1009) a clause with which to solve said sub-goal.

31. Apparatus according to claim 19, wherein said clauses represent data describing features of said network, said features selected from the set:

classes of said network nodes;

end points of said network nodes; and links of said network.

32. Apparatus according to claim 18, wherein said link types may be selected from the set:

binding;

realization;

behavior;

containment.

33. Apparatus according to claim 18, further comprising:

means for displaying a graphical representation (1201–1208, 1402–1412) of said connection plan.

34. Apparatus according to claim 18, further comprising:

means for implementing said connection plan as a connection in said network.

35. Apparatus according to claim 18, wherein said representation comprises a Prolog syntax.

36. A method of processing data describing a hierarchical network comprising a plurality of nodes each said node comprising a set of equipment items, and a plurality of physical links connecting said plurality of nodes, said method characterized by comprising the steps of:

representing a said node equipment as a syntax data describing said node equipment;

representing a plurality of capabilities of said node equipment by creating syntax data describing said capabilities;

representing said links by syntax data describing said links, wherein said syntax data comprises a plurality of clauses; and manipulating said clauses by means of an artificial intelligence technique to obtain a solution of connections which are capable of being transformed into an aggregated connection suitable for application in said network.

37. The method according to claim 36, wherein a said syntax data representation comprises:

at least two nodes representing end points of said links; and a hierarchical network layer upon which said link appears.

38. A syntactical representation according to claim 36, comprising a Prolog syntax.

39. A network management apparatus for a communications network, which network comprises a plurality of interconnected network element devices, which network element devices perform a plurality of functions, said network management apparatus comprising:

a plurality of device controllers each controlling a corresponding network element device, and the device controllers each comprising a plurality of device sub-controllers, each sub-controller representing a corresponding function of the network element device controlled by said device controller;

wherein a set of connections between said device controllers are provided, which connections are arranged in a manner which represents the connections of said network element devices.

40. The network management apparatus as claimed in claim 39, wherein each said device sub-controller comprises:

a data storage means storing data describing a function of a network element device, and a means for generating management control signals for controlling a said network element device.

41. The device sub-controller as claimed in claim 39, wherein a said device sub-controller comprises an object data representation.

42. A method of controlling a network comprising a plurality of network element devices characterised by each supporting a plurality of service functions, said method comprising the steps of:

representing each network element device by a corresponding device controller;

for each device controller, representing each function capability provided by a said corresponding network element device by a corresponding device sub-controller; and linking a plurality of said sub-controllers of different device controllers in a manner which represents an aggregated connection supported by said network element devices.

43. The method as claimed in claim 42, wherein each said device sub-controller comprises:

a data storage medium for storing a set of data signals describing a functionality of a network element device; and a control signal generating means for generating control signals for controlling a function of said network element device.

44. A method of planning a connection supporting a multi-media service function in a communications network comprising a plurality of interconnected nodes capable of supporting said multi-media service function, said method characterized by comprising the steps of:

translating a plurality of function capabilities of said nodes into a plurality of syntax constructs;

translating another plurality of connections between said nodes into a plurality of syntax constructs;

taking each said syntax construct as an operator in a planning system to obtain a connection plan solution; and transforming said connection plan solution into a connection model suitable for application within a network manager apparatus.

45. The method as claimed in claim 44, wherein a said syntactical operator comprises a connection operator.

46. The method as claimed in claim 44, wherein a said syntactical operator comprises a transform operator representing a said function capability of a said node.

47. The method as claimed in claim 44, wherein a said service is represented in terms of a layered structure.

48. The method as claimed in claim 44, wherein said connection plan solution is obtained using an artificial intelligence technique.

49. The method as claimed in claim 44, wherein a said connection comprises a multi-media service connection.

* * * * *